(12) United States Patent
Lei

(10) Patent No.: US 8,559,056 B2
(45) Date of Patent: Oct. 15, 2013

(54) IMAGE PROCESSING APPARATUS, IMAGE FORMING APPARATUS, AND COMPUTER-READABLE RECORDING MEDIUM

(75) Inventor: Hao Lei, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 861 days.

(21) Appl. No.: 12/722,609

(22) Filed: Mar. 12, 2010

(65) Prior Publication Data

US 2011/0037991 A1 Feb. 17, 2011

(30) Foreign Application Priority Data

Aug. 11, 2009 (JP) ................................ 2009-186529

(51) Int. Cl.
H04N 1/40 (2006.01)
H04N 1/60 (2006.01)
G03F 3/08 (2006.01)
G06F 15/00 (2006.01)

(52) U.S. Cl.
USPC .............................. 358/1.9; 358/2.1; 358/518

(58) Field of Classification Search
USPC ......... 358/1.9, 500, 3.23, 515, 518, 520, 525, 358/530, 406, 2.1
See application file for complete search history.

(56) References Cited

U.S. PATENT DOCUMENTS

| | | | |
|---|---|---|---|
| 5,314,509 A | 5/1994 | Kato et al. | |
| 5,323,969 A * | 6/1994 | Mendenhall et al. | 241/1 |
| 5,343,231 A | 8/1994 | Suzuki | |
| 5,349,762 A | 9/1994 | Kato et al. | |
| 5,457,896 A | 10/1995 | Kato et al. | |
| 5,553,396 A | 9/1996 | Kato et al. | |
| 5,596,353 A | 1/1997 | Takada et al. | |
| 5,615,312 A * | 3/1997 | Kohler | 358/1.9 |
| 5,736,996 A | 4/1998 | Takada et al. | |
| 6,287,027 B1 | 9/2001 | Komiya et al. | |
| 6,354,688 B1 | 3/2002 | Inoue et al. | |
| 7,414,755 B2 * | 8/2008 | Ott-Heizmann et al. | 358/1.9 |

(Continued)

FOREIGN PATENT DOCUMENTS

| | | |
|---|---|---|
| JP | 04-110169 | 4/1992 |
| JP | 5-220978 | 8/1993 |
| JP | 09-11508 | 1/1997 |

(Continued)

OTHER PUBLICATIONS

Japanese Office Action in JP 2009-186529 dated Aug. 6, 2013 and English translation.
Machine translation of JP 09-11508.

*Primary Examiner* — Jerome Grant, II
(74) *Attorney, Agent, or Firm* — Fildes & Outland, P.C.

(57) ABSTRACT

There is provided an image forming apparatus including: a sensitivity calculating unit; a first correction amount calculating unit that calculates, for each of the different density values of the color material, correction amounts for correcting density nonuniformity with respect to each recording element in regard to each of the color signals on the basis of reading data; and a second correction amount calculating unit that calculates, for each of the different density values of the color material, correction amounts of the density values of the color material on the basis of the correction amounts of the color signals for each of the different density values of the color material, with respect to the recording elements, and on the basis of the sensitivities of each of the color signals in regard to each recording element.

16 Claims, 23 Drawing Sheets

(56) References Cited

U.S. PATENT DOCUMENTS

| | | |
|---|---|---|
| 2006/0164700 A1 | 7/2006 | Hayasi |
| 2006/0209325 A1* | 9/2006 | Nishikuni ............... 358/1.9 |
| 2007/0296986 A1* | 12/2007 | Watanabe et al. .......... 358/1.9 |
| 2009/0123085 A1* | 5/2009 | Yoshimura et al. ......... 382/264 |
| 2010/0086201 A1* | 4/2010 | Muto et al. ............... 382/162 |

FOREIGN PATENT DOCUMENTS

| | | |
|---|---|---|
| JP | 2938929 | 8/1999 |
| JP | 11-309880 | 11/1999 |
| JP | 2000-168109 | 6/2000 |
| JP | 2005-231320 | 9/2005 |
| JP | 2006-211556 | 8/2006 |
| JP | 2006-238408 | 9/2006 |

* cited by examiner

FIG. 10

| INPUT DENSITY | a* | b* | Δa* | Δb* | x | y | sinx | siny |
|---|---|---|---|---|---|---|---|---|
| 0 | 0 | 0 | | | | | | |
| 2 | -0.72 | -1.17 | -0.72 | -1.17 | 0.23 | 2.12 | 0.23 | 0.85 |
| 4 | -2.04 | -3.21 | -1.33 | -2.04 | 0.21 | 2.15 | 0.21 | 0.84 |
| 6 | -3.68 | -7.25 | -1.64 | -4.04 | 0.40 | 1.96 | 0.39 | 0.93 |
| 8 | -5.05 | -11.24 | -1.37 | -3.99 | 0.45 | 1.90 | 0.44 | 0.95 |
| 10 | -6.14 | -14.85 | -1.09 | -3.62 | 0.49 | 1.86 | 0.47 | 0.96 |
| 12 | -6.43 | -19.13 | -0.29 | -4.27 | 0.72 | 1.64 | 0.66 | 1.00 |
| 16 | -6.40 | -22.96 | 0.04 | -3.83 | 0.79 | 1.56 | 0.71 | 1.00 |
| 20 | -6.34 | -27.10 | 0.05 | -4.14 | 0.80 | 1.56 | 0.72 | 1.00 |
| 24 | -5.71 | -30.50 | 0.63 | -3.40 | 0.97 | 1.39 | 0.82 | 0.98 |
| 30 | -4.46 | -35.20 | 1.25 | -4.69 | 1.05 | 1.31 | 0.86 | 0.97 |
| 36 | -2.79 | -39.13 | 1.68 | -3.93 | 1.19 | 1.17 | 0.93 | 0.92 |
| 42 | -0.97 | -42.20 | 1.81 | -3.07 | 1.32 | 1.04 | 0.97 | 0.86 |
| 48 | 0.83 | -44.65 | 1.80 | -2.45 | 1.42 | 0.94 | 0.99 | 0.81 |
| 56 | 2.64 | -46.61 | 1.81 | -1.96 | 1.53 | 0.82 | 1.00 | 0.73 |
| 64 | 4.85 | -48.51 | 2.21 | -1.90 | 1.65 | 0.71 | 1.00 | 0.65 |
| 255 | 11.62 | -51.30 | 6.77 | -2.79 | 1.96 | 0.39 | 0.92 | 0.38 |

FIG. 11

| INPUT DENSITY | ΔC | ΔM | siny/(siny+sinx) | sinx/(siny+sinx) | CORRECTION AMOUNT OF DENSITY VALUE |
|---|---|---|---|---|---|
| 2 | -0.3 | -0.2 | 0.79 | 0.21 | -0.3 |
| 4 | -0.4 | -0.5 | 0.80 | 0.20 | -0.4 |
| 6 | -0.5 | -0.5 | 0.70 | 0.30 | -0.5 |
| 8 | -0.5 | -0.5 | 0.68 | 0.32 | -0.5 |
| 10 | -0.5 | -0.5 | 0.67 | 0.33 | -0.5 |
| 12 | -0.5 | -0.4 | 0.60 | 0.40 | -0.5 |
| 16 | -0.7 | -0.7 | 0.58 | 0.42 | -0.7 |
| 20 | -0.9 | -0.9 | 0.58 | 0.42 | -0.9 |
| 24 | -1.5 | -1.5 | 0.54 | 0.46 | -1.5 |
| 30 | -1.2 | -0.8 | 0.53 | 0.47 | -1.0 |
| 36 | -2.1 | -1.8 | 0.50 | 0.50 | -1.9 |
| 42 | -2.8 | -2.5 | 0.47 | 0.53 | -2.6 |
| 48 | -3.4 | -3.5 | 0.45 | 0.55 | -3.5 |
| 56 | -5.4 | -5.2 | 0.42 | 0.58 | -5.3 |
| 64 | -4.8 | -3.1 | 0.40 | 0.60 | -3.8 |
| 255 | -0.9 | -26.3 | 0.29 | 0.71 | -18.9 |

| INPUT DENSITY | CORRECTION AMOUNT OF DENSITY VALUE |
|---|---|
| 2 | -0.3 |
| 4 | -0.4 |
| 6 | -0.5 |
| 8 | -0.5 |
| 10 | -0.5 |
| 12 | -0.5 |
| 16 | -0.7 |
| 20 | -0.9 |
| 24 | -1.5 |
| 30 | -1.0 |
| 36 | -1.9 |
| 42 | -2.6 |
| 48 | -3.5 |
| 56 | -5.3 |
| 64 | -3.8 |
| 255 | -18.9 |

⇧ EXPAND TO 256 TONES (LINEAR INTERPOLATION)

(B)

| INPUT DENSITY | CORRECTION AMOUNT OF DENSITY VALUE |
|---|---|
| 1 | -0.2 |
| 2 | -0.3 |
| 3 | -0.4 |
| 4 | -0.4 |
| · | · |
| · | · |
| · | · |
| · | · |
| · | · |
| 253 | -18.7 |
| 254 | -18.8 |
| 255 | -18.9 |

⇧ CORRECTION LUT (C)

| INPUT DENSITY | CORRECTION VALUE |
|---|---|
| 1 | 0.8 |
| 2 | 1.7 |
| 3 | 2.6 |
| 4 | 3.6 |
| · | · |
| · | · |
| · | · |
| · | · |
| · | · |
| 253 | 234.3 |
| 254 | 235.2 |
| 255 | 236.1 |

FIG. 15

(A) SCAN DATA

| PATTERN | INPUT DENSITY | SCAN VALUE | | |
|---|---|---|---|---|
| | | B QUANTITY | G QUANTITY | R QUANTITY |
| 0 | 0 | | | |
| 1 | 2 | 0.5 | 1.7 | 3.4 |
| 2 | 4 | 0.8 | 2.4 | 6.5 |
| 3 | 6 | 1.3 | 5.9 | 14.7 |
| 4 | 8 | 3.1 | 14.0 | 31.7 |
| 5 | 10 | 5.4 | 22.6 | 48.7 |
| 6 | 12 | 7.7 | 30.7 | 64.4 |
| 7 | 16 | 11.9 | 42.1 | 82.6 |
| 8 | 20 | 16.3 | 52.9 | 99.1 |
| 9 | 24 | 21.1 | 64.6 | 117.7 |
| 10 | 30 | 25.6 | 74.8 | 132.7 |
| 11 | 36 | 31.4 | 88.6 | 153.2 |
| 12 | 42 | 37.1 | 101.0 | 170.9 |
| 13 | 48 | 41.8 | 111.0 | 184.7 |
| 14 | 56 | 45.2 | 118.8 | 195.2 |
| 15 | 64 | 48.4 | 125.5 | 203.2 |
| 16 | 255 | 52.1 | 132.8 | 210.4 |
| | | 68.0 | 154.5 | 218.5 |

(B) SENSITIVITY

| PATTERN | INPUT DENSITY | SENSITIVITY | | |
|---|---|---|---|---|
| | | K_B | K_G | K_R |
| 0 | 0 | | | |
| 1 | 2 | 0.15 | 0.38 | 1.08 |
| 2 | 4 | 0.29 | 1.74 | 4.59 |
| 3 | 6 | 0.44 | 2.03 | 4.24 |
| 4 | 8 | 0.56 | 2.14 | 4.26 |
| 5 | 10 | 0.58 | 2.02 | 3.93 |
| 6 | 12 | 0.71 | 1.91 | 3.02 |
| 7 | 16 | 0.72 | 1.80 | 2.75 |
| 8 | 20 | 0.80 | 1.94 | 3.11 |
| 9 | 24 | 0.75 | 1.71 | 2.49 |
| 10 | 30 | 0.59 | 1.38 | 2.06 |
| 11 | 36 | 0.56 | 1.23 | 1.77 |
| 12 | 42 | 0.47 | 1.00 | 1.38 |
| 13 | 48 | 0.35 | 0.78 | 1.05 |
| 14 | 56 | 0.31 | 0.67 | 0.80 |
| 15 | 64 | 0.27 | 0.52 | 0.52 |
| 16 | 255 | 0.11 | 0.14 | 0.05 |

FIG. 16

(A) NORMALIZED VALUES

| PATTERN | INPUT DENSITY | S_B | S_G | S_R |
|---|---|---|---|---|
| 0 | 0 | | | |
| 1 | 2 | 2.9 | 4.0 | 6.5 |
| 2 | 4 | 5.0 | 9.8 | 17.2 |
| 3 | 6 | 11.7 | 23.2 | 37.0 |
| 4 | 8 | 20.1 | 37.3 | 56.8 |
| 5 | 10 | 28.8 | 50.6 | 75.2 |
| 6 | 12 | 44.7 | 69.5 | 96.4 |
| 7 | 16 | 61.0 | 87.3 | 115.6 |
| 8 | 20 | 79.1 | 106.6 | 137.4 |
| 9 | 24 | 95.9 | 123.5 | 154.8 |
| 10 | 30 | 117.9 | 146.2 | 178.8 |
| 11 | 36 | 139.0 | 166.6 | 199.4 |
| 12 | 42 | 156.6 | 183.1 | 215.5 |
| 13 | 48 | 169.7 | 196.0 | 227.8 |
| 14 | 56 | 181.4 | 207.1 | 237.1 |
| 15 | 64 | 195.4 | 219.1 | 245.6 |
| 16 | 255 | 255.0 | 255.0 | 255.0 |

(B) ACTUAL DENSITY VALUES

| INPUT DENSITY | NewS |
|---|---|
| 0 | |
| 2 | 5.6 |
| 4 | 14.7 |
| 6 | 31.1 |
| 8 | 47.9 |
| 10 | 63.5 |
| 12 | 80.8 |
| 16 | 98.5 |
| 20 | 119.2 |
| 24 | 135.1 |
| 30 | 158.7 |
| 36 | 178.5 |
| 42 | 194.4 |
| 48 | 207.1 |
| 56 | 216.1 |
| 64 | 224.7 |
| 255 | 255.0 |

FIG. 18

SCAN DATA

| PATTERN | INPUT DENSITY | SCAN VALUE | | |
|---|---|---|---|---|
| | | B QUANTITY | G QUANTITY | R QUANTITY |
| 0 | 0 | 0.5 | 0.1 | 1.4 |
| 1 | 2 | 3.8 | 0.2 | 0.1 |
| 2 | 4 | 9.2 | 0.2 | 0.1 |
| 3 | 6 | 14.7 | 0.4 | 0.1 |
| 4 | 8 | 20.3 | 0.6 | 0.0 |
| 5 | 10 | 25.1 | 0.7 | 0.0 |
| 6 | 12 | 30.7 | 1.2 | 0.1 |
| 7 | 16 | 40.6 | 2.2 | 0.1 |
| 8 | 20 | 57.1 | 4.2 | 0.2 |
| 9 | 24 | 74.6 | 7.0 | 0.7 |
| 10 | 30 | 98.2 | 10.5 | 1.8 |
| 11 | 36 | 117.8 | 13.6 | 3.4 |
| 12 | 42 | 131.8 | 15.9 | 4.8 |
| 13 | 48 | 141.8 | 17.0 | 5.1 |
| 14 | 56 | 151.1 | 17.2 | 4.3 |
| 15 | 64 | 155.9 | 17.3 | 2.3 |
| 16 | 255 | 174.8 | 18.1 | 0.2 |

(A)

SENSITIVITY

| PATTERN | INPUT DENSITY | SENSITIVITY | |
|---|---|---|---|
| | | K_B | K_G |
| 0 | 0 | | |
| 1 | 2 | 1.67 | 0.02 |
| 2 | 4 | 2.72 | 0.04 |
| 3 | 6 | 2.74 | 0.08 |
| 4 | 8 | 2.82 | 0.08 |
| 5 | 10 | 2.39 | 0.09 |
| 6 | 12 | 2.77 | 0.25 |
| 7 | 16 | 2.48 | 0.23 |
| 8 | 20 | 4.12 | 0.52 |
| 9 | 24 | 4.38 | 0.70 |
| 10 | 30 | 3.93 | 0.59 |
| 11 | 36 | 3.28 | 0.51 |
| 12 | 42 | 2.33 | 0.39 |
| 13 | 48 | 1.66 | 0.18 |
| 14 | 56 | 1.17 | 0.02 |
| 15 | 64 | 0.59 | 0.02 |
| 16 | 255 | 0.10 | 0.00 |

NORMALIZED VALUES

| PATTERN | INPUT DENSITY | S_B | S_G |
|---|---|---|---|
| 0 | 0 | | |
| 1 | 2 | 5.5 | 2.3 |
| 2 | 4 | 13.5 | 3.4 |
| 3 | 6 | 21.5 | 5.7 |
| 4 | 8 | 29.7 | 8.0 |
| 5 | 10 | 36.6 | 10.6 |
| 6 | 12 | 44.7 | 17.5 |
| 7 | 16 | 59.2 | 30.6 |
| 8 | 20 | 83.3 | 59.7 |
| 9 | 24 | 108.8 | 99.0 |
| 10 | 30 | 143.2 | 148.8 |
| 11 | 36 | 171.9 | 192.2 |
| 12 | 42 | 192.3 | 224.8 |
| 13 | 48 | 206.8 | 239.9 |
| 14 | 56 | 220.5 | 242.5 |
| 15 | 64 | 227.4 | 244.7 |
| 16 | 255 | 255.0 | 255.0 |

(A)

ACTUAL DENSITY VALUES

| INPUT DENSITY | NewS |
|---|---|
| 0 | |
| 2 | 5.5 |
| 4 | 13.3 |
| 6 | 21.0 |
| 8 | 29.1 |
| 10 | 35.7 |
| 12 | 42.6 |
| 16 | 56.9 |
| 20 | 81.0 |
| 24 | 108.3 |
| 30 | 145.1 |
| 36 | 176.2 |
| 42 | 198.8 |
| 48 | 211.4 |
| 56 | 221.2 |
| 64 | 227.4 |
| 255 | 255.0 |

| INPUT DENSITY | ΔB | ΔG | ΔR |
|---|---|---|---|
| 0 | | | |
| 2 | -0.8 | -0.2 | -0.3 |
| 4 | -1.9 | -0.5 | -0.4 |
| 6 | -1 | -0.5 | -0.5 |
| 8 | -0.9 | -0.5 | -0.5 |
| 10 | -0.7 | -0.5 | -0.5 |
| 12 | -0.2 | -0.4 | -0.5 |
| 16 | -0.8 | -0.7 | -0.7 |
| 20 | -1.1 | -0.9 | -0.9 |
| 24 | -1.3 | -1.5 | -1.5 |
| 30 | -0.7 | -0.8 | -1.2 |
| 36 | -1.8 | -1.8 | -2.1 |
| 42 | -2.5 | -2.5 | -2.8 |
| 48 | -3.4 | -3.5 | -3.4 |
| 56 | -5.2 | -5.2 | -5.4 |
| 64 | -3.1 | -3.1 | -4.8 |
| 255 | -35.2 | -26.3 | -0.9 |

(B)

| INPUT DENSITY | K_B% | K_G% | K_R% |
|---|---|---|---|
| 0 | | | |
| 2 | 0.10 | 0.24 | 0.67 |
| 4 | 0.04 | 0.26 | 0.69 |
| 6 | 0.07 | 0.30 | 0.63 |
| 8 | 0.08 | 0.31 | 0.61 |
| 10 | 0.09 | 0.31 | 0.60 |
| 12 | 0.13 | 0.34 | 0.54 |
| 16 | 0.14 | 0.34 | 0.52 |
| 20 | 0.14 | 0.33 | 0.53 |
| 24 | 0.15 | 0.35 | 0.50 |
| 30 | 0.15 | 0.34 | 0.51 |
| 36 | 0.16 | 0.35 | 0.60 |
| 42 | 0.16 | 0.36 | 0.48 |
| 48 | 0.16 | 0.38 | 0.48 |
| 56 | 0.17 | 0.38 | 0.45 |
| 64 | 0.20 | 0.40 | 0.40 |
| 255 | 0.35 | 0.48 | 0.18 |

(C)

| INPUT DENSITY | CORRECTION AMOUNT OF DENSITY VALUE |
|---|---|
| 0 | |
| 2 | -0.3 |
| 4 | -0.5 |
| 6 | -0.5 |
| 8 | -0.5 |
| 10 | -0.5 |
| 12 | -0.4 |
| 16 | -0.7 |
| 20 | -0.9 |
| 24 | -1.5 |
| 30 | -1.0 |
| 36 | -1.9 |
| 42 | -2.6 |
| 48 | -3.4 |
| 56 | -5.3 |
| 64 | -3.8 |
| 255 | -24.9 |

IMAGE PROCESSING APPARATUS, IMAGE FORMING APPARATUS, AND COMPUTER-READABLE RECORDING MEDIUM

CROSS-REFERENCE TO RELATED APPLICATION

This application is based on and claims priority under 35 USC 119 from Japanese Patent Application No. 2009-186529 filed Aug. 11, 2009.

BACKGROUND

Technical Field

The present invention relates to an image processing apparatus, an image processing method, and a computer-readable recording medium.

SUMMARY

An aspect of the present invention provides an image processing apparatus including:

a sensitivity calculating unit that calculates sensitivities of each of the color signals for each of the different density values of the color material, on the basis of a reading data obtained by reading a reference image, the reference image being recorded by plural recording elements that use color material to record, having plural density patterns for each of predetermined different density values of color material, and expressed by plural types of color signals;

a first correction amount calculating unit that calculates, for each of the different density values of the color material, correction amounts for at least one of the plural recording elements in regard to each of the color signals on the basis of the reading data; and a second correction amount calculating unit that calculates, for each of the different density values of the color material, correction amounts of the density values of the color material on the basis of the correction amounts of the color signals for each of the different density values of the color material, with respect to the at least one of the plural recording elements, that have been calculated in regard to each of the color signals and on the basis of the sensitivities of each of the color signals that have been calculated for each of the different density values of the color material in regard to the at least one of the plural recording elements.

BRIEF DESCRIPTION OF THE DRAWINGS

Exemplary embodiments of the present invention will be described in detail based on the following figures, wherein:

FIG. 10 is a diagram showing one example of various types of data obtained in regard to each input density value of the cyan test pattern;

FIG. 11 is a diagram showing one example of various types of data obtained in regard to each input density value of the cyan test pattern;

FIG. 12 is a diagram showing one example of correction amounts of density values obtained in regard to each input density value of the cyan test pattern;

FIG. 15 is a diagram showing one example of scan values of each signal of RGB obtained in regard to each input density value of the cyan test pattern;

FIG. 16 is a diagram showing one example where the pixel values of each signal of RGB obtained in regard to each input density value of the cyan test pattern have been normalized (FIG. 16(1)), and showing one example of actual density values obtained in regard to each input density value of the cyan test pattern (FIG. 16(2));

FIG. 18 is a diagram showing one example of scan values of each signal of RGB obtained in regard to each input density value of the yellow test pattern (FIG. 18(1)), and showing one example of sensitivities of each signal of RGB obtained in regard to each input density value of the yellow test pattern (FIG. 18(2));

FIG. 19 is a diagram showing one example where the pixel values of each signal of RGB obtained in regard to each input density value of the yellow test pattern have been normalized (FIG. 19(1)), and showing one example of actual density values obtained in regard to each input density value of the yellow test pattern (FIG. 19(2));

FIG. 22 is a diagram showing one example of correction amounts of each signal of RGB obtained in regard to each input density value of the cyan test pattern (FIG. 22(1)), showing one example of sensitivity percentages of each signal of RGB obtained in regard to each input density value of the cyan test pattern (FIG. 22(2)), and showing one example of correction amounts of density values obtained in regard to each tone of the input density values of the cyan test pattern.

DETAILED DESCRIPTION

Exemplary embodiments of the present invention will be described in detail below with reference to the drawings. A case where the image forming apparatus of the present invention is applied to an inkjet liquid droplet jetting apparatus will be described below.

Figure 1:
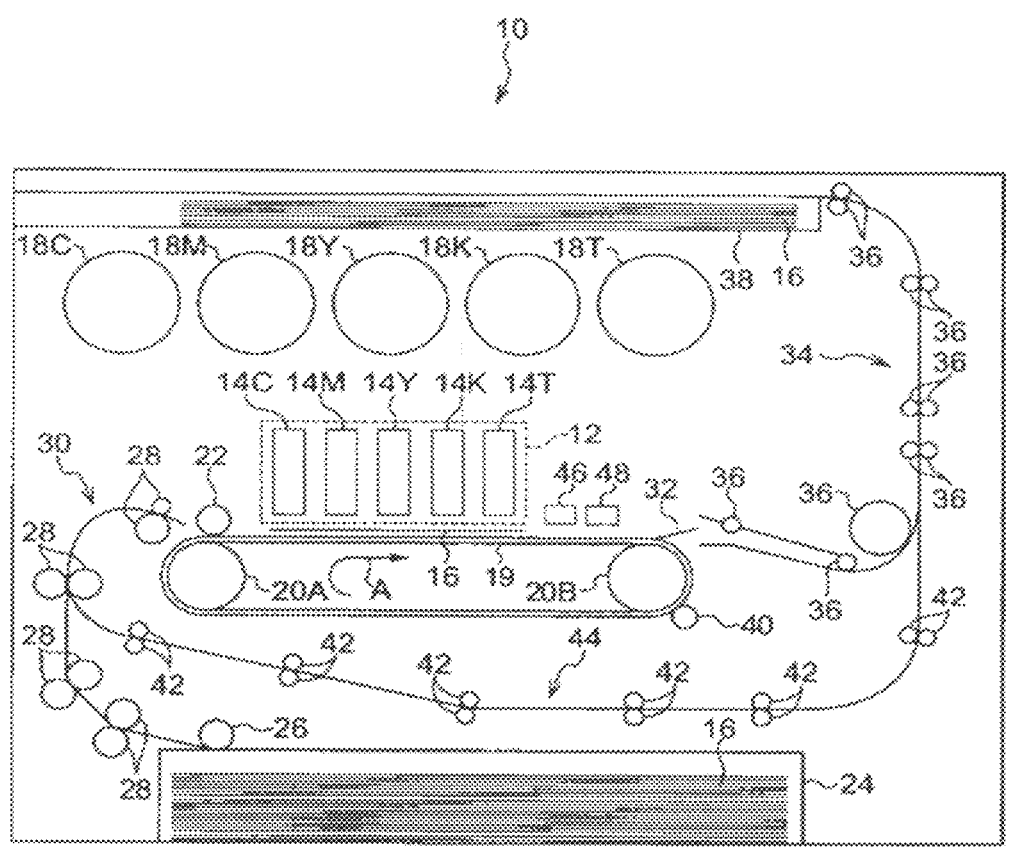
FIG. 1 is a general diagram showing the overall configuration of a liquid droplet jetting apparatus according to a first exemplary embodiment of the invention.

FIG. 1 is a general diagram showing the overall configuration of an inkjet liquid droplet jetting apparatus 10 according to a first exemplary embodiment.

The liquid droplet jetting apparatus 10 is equipped with a recording head array 12. The recording head array 12 is equipped with five recording heads 14C, 14M, 14Y, 14K and 14T in correspondence to cyan color ink liquid (C), magenta color ink liquid (M), yellow color ink liquid (Y), black color ink liquid (K) and processing liquid (T).

The recording heads 14C, 14M, 14Y, 14K and 14T are elongate recording heads called full-width array (FWA) recording heads whose widths are substantially equal to the width of recording paper 16. The recording heads 14C, 14M, 14Y, 14K and 14T are fixed and jet droplets of each ink liquid and droplets of the processing liquid from jetting nozzles onto the conveyed recording paper 16 to form an image on the basis of image data inputted to the liquid droplet jetting apparatus 10. The processing liquid is colorless or pale-colored and is dropped in droplets so as to be superimposed on the droplets of the ink liquids of each color after droplets of the ink liquids of each color have been dropped onto the recording paper 16, whereby the processing liquid reduces ink bleeding and improves image quality.

The recording heads 14C, 14M, 14Y, 14K and 14T are connected by unillustrated tubes to ink cartridges 18C, 18M, 18Y, 18K and 18T in which each ink liquid of CMYK and the processing liquid are respectively stored, and the ink liquids and the processing liquid are supplied to the recording heads 14C, 14M, 14Y, 14K and 14T. As the ink, it suffices to use known types of ink, such as water-based ink, oil-based ink and solvent-based ink.

Further, the liquid droplet jetting apparatus 10 is equipped with a conveyor belt 19 that is an endless belt under the recording head array 12. The conveyor belt 19 is entrained around drive rolls 20A and 20B and is driven to go around in the direction of arrow A that is a clockwise direction in FIG. 1 by the rotational force of the drive rolls 20A and 20B. The portion of the conveyor belt 19 facing the recording head array 12 is configured to be flat, the recording paper 16 is conveyed on this flat region, ink liquid droplets are jetted from the recording heads 14C, 14M, 14Y and 14K with respect to the recording paper 16, and an image is formed. At this time, the recording heads 14C, 14M, 14Y and 14K jet the ink liquid droplets from the jetting nozzles onto the recording paper 16 at different timings. Thus, the ink liquid droplets of each color are superimposed on the recording paper 16 and an image is formed.

Further, the liquid droplet jetting apparatus 10 is equipped with a charge roll 22 on the upstream side of the region of the conveyor belt 19 facing the recording head array 12 in the direction in which the conveyor belt 19 is driven. A preset voltage is applied to the charge roll 22, and the charge roll 22 passively moves while sandwiching the conveyor belt 19 and the recording paper 16 between itself and the drive roll 20A, whereby the charge roll 22 imparts a charge to the recording paper 16. The recording paper 16 to which the charge has been imparted by the charge roll 22 becomes electrostatically attracted to the conveyor belt 19 and is conveyed as the conveyor belt 19 is driven to go around.

The recording paper 16 is stored in a paper feed tray 24 disposed on the lower side of the inside of the liquid droplet jetting apparatus 10. The recording paper 16 is taken out one sheet at a time from the paper feed tray 24 by a pickup roll 26 and is conveyed to the conveyor belt 19 by a recording paper conveyance section 30 equipped with plural conveyance rollers 28.

On the downstream side of the portion of the conveyor belt 19 facing the recording head array 12 in the direction in which the conveyor belt 19 is driven in FIG. 1, there is placed a separation plate 32. The separation plate 32 separates the recording paper 16 from the conveyor belt 19. The recording paper 16 that has been separated from the conveyor belt 19 is conveyed by plural discharge rollers 36 configuring a discharge conveyance section 34 and is discharged into a paper discharge tray 38 disposed in the upper portion of the liquid droplet jetting apparatus 10.

On the downstream side of the separation plate 32 in the direction of rotation of the conveyor belt 19 in FIG. 1, there is placed a cleaning roll 40 that sandwiches and holds the conveyor belt 19 between itself and the drive roll 20B. The cleaning roll 40 cleans the surface of the conveyor belt 19.

Further, the recording paper 16 on which an image has been formed on one side is again conveyed to the conveyor belt 19 by an inversion conveyance section 44 configured by plural inversion-use rollers 42, and an image is formed on the other side. The inversion conveyance section 44 branches from the discharge conveyance section 34 and is placed so as to convey the recording paper 16 to the recording paper conveyance section 30.

On the downstream side of the portion of the conveyor belt 19 facing the recording head array 12 in the direction of rotation of the conveyor belt 19 in FIG. 1 and on the upstream side of the position where the separation plate 32 is placed in the direction of rotation of the conveyor belt 19, there are placed an optical sensor 46 and a LAB measuring unit 48. The optical sensor 46 is configured by a CCD line sensor or a CCD area sensor, for example, and reads, at a predetermined reading resolution, a test pattern image for correcting the densities of the ink that the jetting nozzles jet, for example. The optical sensor 46 reads an image of the entire surface of the recording paper 16 as a result of the recording paper 16 being conveyed. The LAB measuring unit 48 measures CIELAB a* values and b* values of the test pattern image. The a* values and the b* values of the entire surface of the recording paper 16 are measured by the LAB measuring unit 48 as a result of the recording paper 16 being conveyed.

Figure 2:
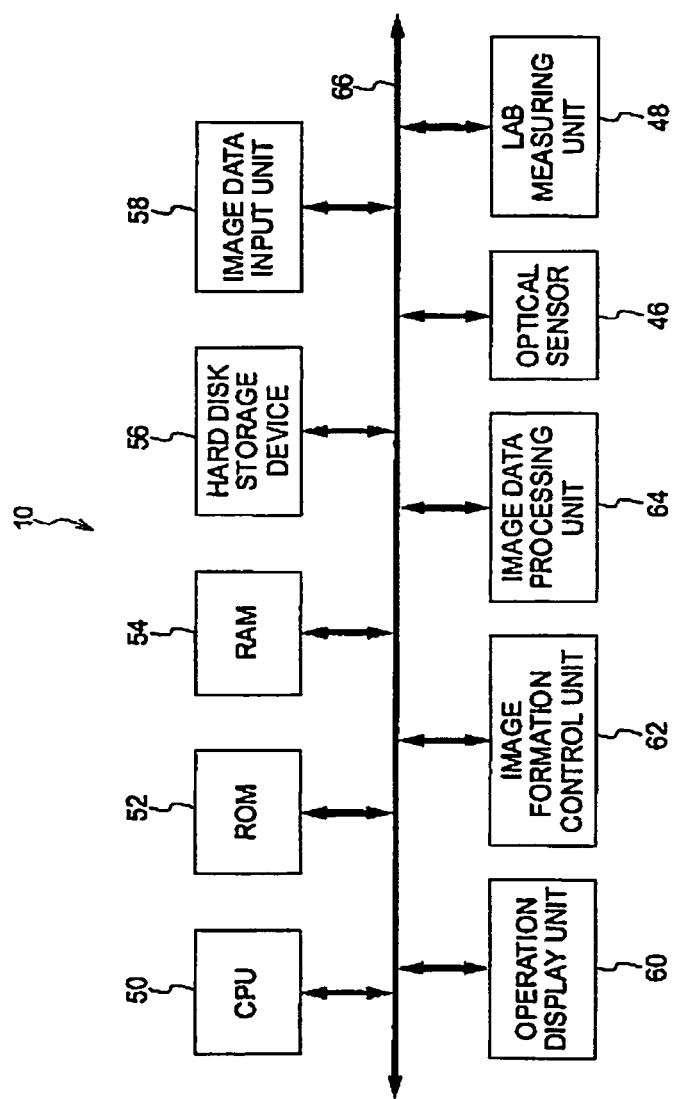
FIG. 2 is a block diagram showing relevant portions of a control system of the liquid droplet jetting apparatus according to the first exemplary embodiment of the invention.

FIG. 2 is a diagram showing relevant portions of a control system of the liquid droplet jetting apparatus 10.

The liquid droplet jetting apparatus 10 is equipped with a CPU 50 that controls the entire liquid droplet jetting apparatus 10. The CPU 50 is connected via a bus 66 such as a control bus or a data bus to a ROM 52, a RAM 54, a hard disk storage device 56, an image data input unit 58, an operation display unit 60, an image formation control unit 62, an image data processing unit 64, the optical sensor 46 and the LAB measuring unit 48.

The ROM 52 stores a control program for controlling the liquid droplet jetting apparatus 10. The RAM 54 is used as a workspace for processing various types of data and the like. The hard disk storage device 56 stores image data, test pattern data for forming test pattern images, and various types of data relating to image formation. Further, the hard disk storage device 56 stores nozzle characteristic data per jetting nozzle (a later-described correction LUT, etc.).

The image data input unit 58 receives input of image data from an unillustrated personal computer or the like. The inputted image data are transmitted to the hard disk storage device 56.

The operation display unit 60 is configured to include a touch panel, in which an operation function and a display function are integrated, and operation buttons for a user to perform various types of operations. The operation display unit 60 receives operations such as starting image formation on the recording paper 16 and notifies the user of the status of control of the liquid droplet jetting apparatus 10 and the like.

The image formation control unit 62 controls the driving of the recording heads 14C, 14M, 14Y, 14K and 14T and the driving of motors (not shown) of the various types of rolls in order to form an image on the recording paper 16 on the basis of the image data.

The image data processing unit 64 performs image processing such as ink density adjustment with respect to the image data stored in the hard disk storage device 56. Further, the image data processing unit 64 uses the data obtained as a result of the LAB measuring unit 48 measuring the test pattern, performs processing of the reading data obtained by the optical sensor 46 reading the test pattern, and creates an ink density correction-use lookup table (hereinafter called a "correction LUT") for correcting the ink densities of the image to be formed on the recording paper 16.

Next, the test pattern used in the first exemplary embodiment will be described. Density nonuniformity correction processing that is executed in the present exemplary embodiment is the same processing in regard to each of the recording heads 14C, 14M, 14Y, 14K and 14T, so a test pattern in regard to one of the recording heads 14 will be described below.

Figure 3:
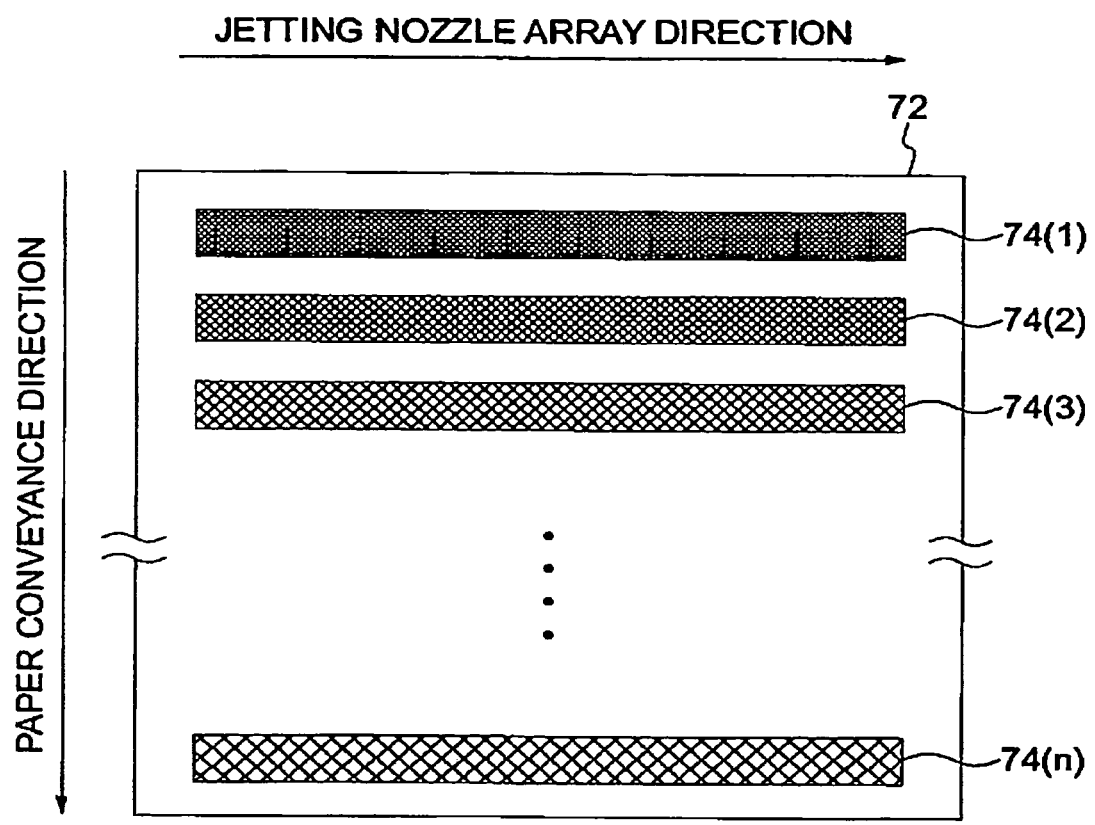
FIG. 3 is a diagram showing one example of a test pattern.

As shown in FIG. 3, a test pattern 72 is configured by arranging plural density patterns 74 for detecting density nonuniformity. The density patterns 74 are formed in bands of predetermined widths with respect to the paper conveyance direction and are of the same width as the printing width of the recording heads 14 with respect to the array direction of the jetting nozzles per density pattern of different density values. Each density pattern 74 is placed every predetermined interval in the conveyance direction of the paper and is given a number such that there are a density pattern 74(1), a density pattern 74(2) and a density pattern 74(3) from the top.

Figure 4:
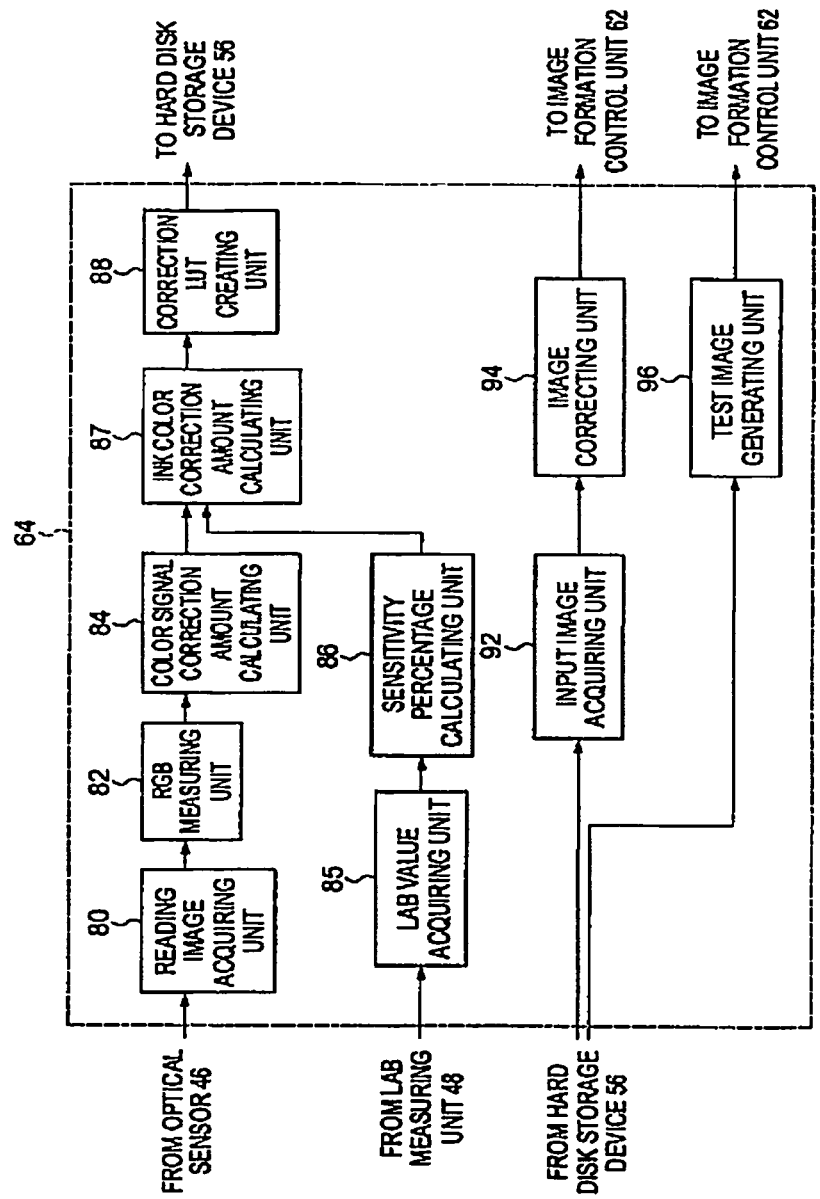
FIG. 4 is a block diagram showing the functional configuration of an image data processing unit of the liquid droplet jetting apparatus according to the first exemplary embodiment of the invention.

When expressed in functional blocks, the image data processing unit 64 is, as shown in FIG. 4, equipped with a reading image acquiring unit 80, an RGB measuring unit 82, a color signal correction amount calculating unit (a first correction amount calculating unit) 84, a LAB value acquiring unit 85, a sensitivity percentage calculating unit 86, an ink color correction amount calculating unit (a second correction amount calculating unit) 87, a correction LUT creating unit 88, an input image acquiring unit 92, an image correcting unit 94 and a test image generating unit 96.

The reading image acquiring unit 80 acquires reading data obtained by the optical sensor 46 reading the test pattern. The RGB measuring unit 82 measures each of the RGB signals (scan values) in the recording positions of each jetting nozzle per density value of the density patterns on the basis of the reading data representing the read test pattern.

Figure 5:
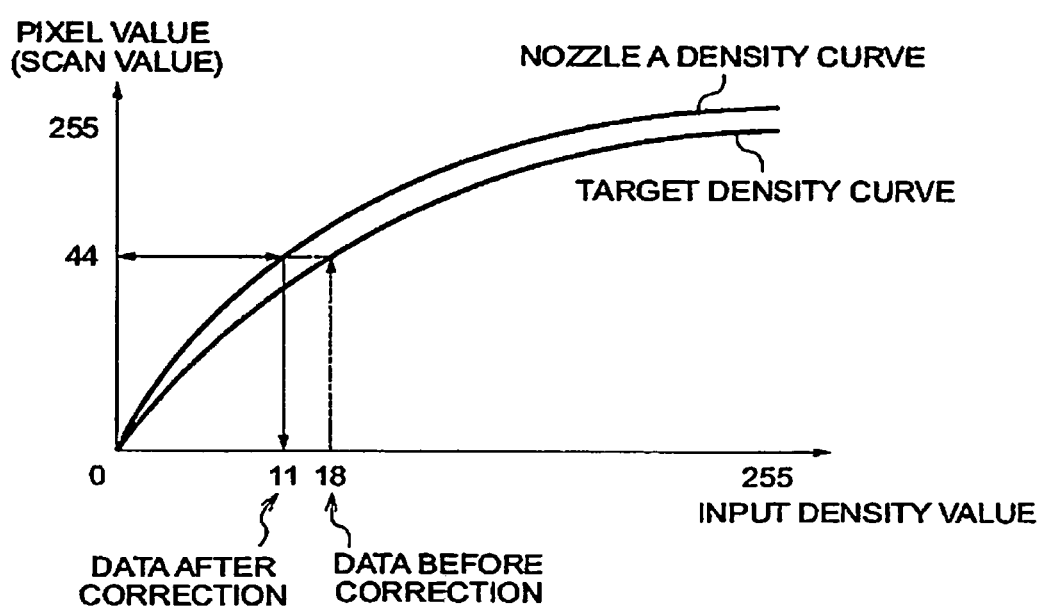
FIG. 5 is a graph showing the relationship between input density values of the test pattern and pixels values of reading data.

The color signal correction amount calculating unit 84 calculates correction amounts for nonuniformity correction of the RGB signals on the basis of each of the RGB signals (scan values) in the recording positions of each jetting nozzle per density value of the density patterns. For example, as shown in FIG. 5, the color signal correction amount calculating unit 84 calculates, per density values of the density patterns, correction amounts of the R signal (correction amounts of input density values) for density nonuniformity correction for obtaining changes in target pixel values of the R signal on the basis of changes in the pixel values of the R signal obtained from the pixel values of the R signal in the recording position of a certain jetting nozzle A per density value of the density patterns (density curve of nozzle A) and on the basis of changes in target pixel values of the R signal obtained from average values of the R signal in the recording positions of each jetting nozzle per density of the density patterns (target density curve). Correction amounts of the density values of the G signal and correction amounts of the density values of the B signal are also calculated in the same manner. Further, the C signal is C=1−R, the M signal is M=1−G and the Y signal is Y=1−B, and correction amounts of the density values of the C signal, correction amounts of the density values of the M signal and correction amounts of the density values of the Y signal are also calculated.

Figure 6:
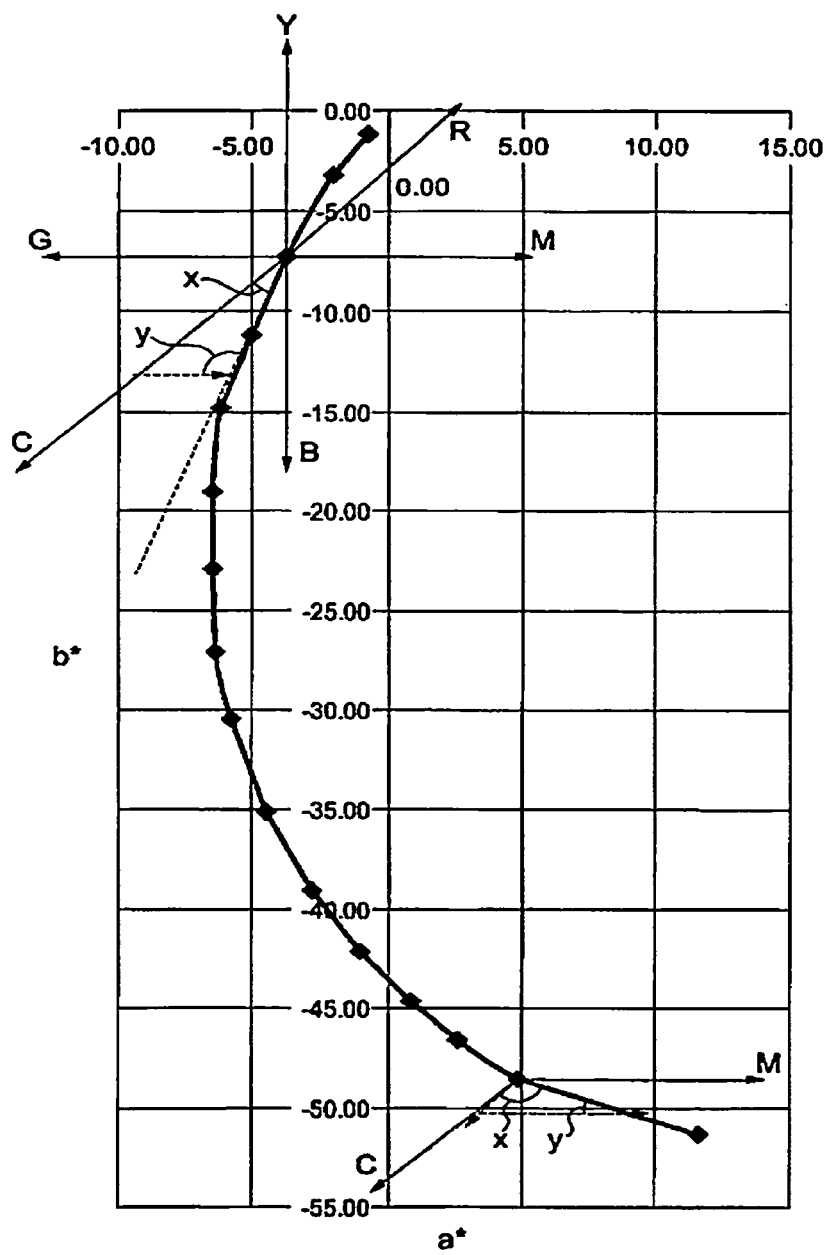
FIG. 6 is a graph showing a* values and b* values measured from a cyan test pattern.

The LAB value acquiring unit 85 acquires data measured by the LAB measuring unit 48 and acquires the a* values and the b* values per density value of the density patterns. For example, when the LAB value acquiring unit 85 measures the a* values and the b* values per density value of the density patterns in regard to the cyan test pattern formed by the recording head 14C, as shown in FIG. 6, a curve representing the changes in the a* values and the b* values is obtained. Here, it will be understood from the curve of the a* values and the b* values that the color signal of C (=1−R) and the color signal of M (=1−G) have sensitivity relating to the a* values and the b* values with respect to cyan. Consequently, in nonuniformity correction with respect to the cyan test pattern, the color signal of C (=1−R) and the color signal of M (=1−G) are used.

Figure 7:
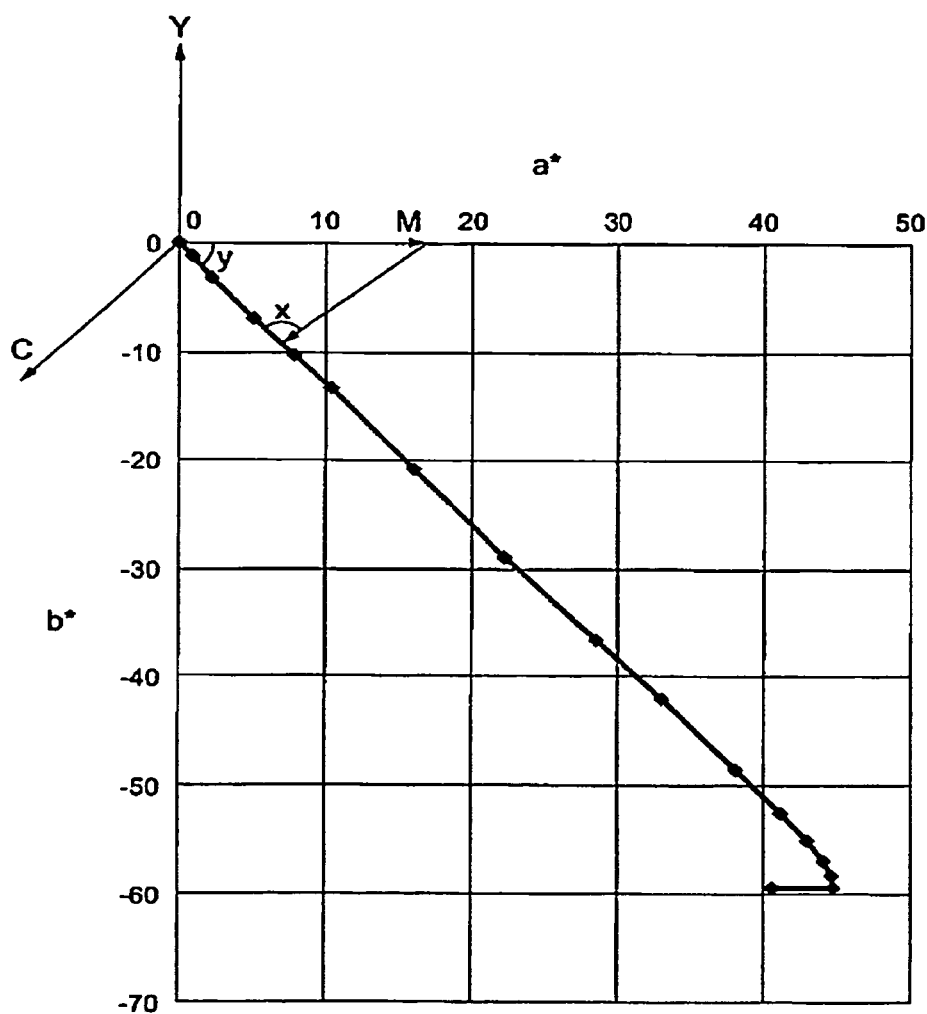
FIG. 7 is a graph showing a* values and b* values measured from a magenta test pattern.

Further, when the LAB value acquiring unit 85 measures the a* values and the b* values per density value of the density patterns in regard to the magenta test pattern formed by the recording head 14M, as shown in FIG. 7, a curve representing the changes in the a* values and the b* values is obtained. Here, it will be understood from the curve of the a* values and the b* values that the color signal of C (=1−R) and the color signal of M (=1−G) have sensitivity relating to the a* values and the b* values with respect to magenta. Consequently, in nonuniformity correction with respect to the magenta test pattern, the color signal of C (=1−R) and the color signal of M (=1−G) are used.

Figure 8:
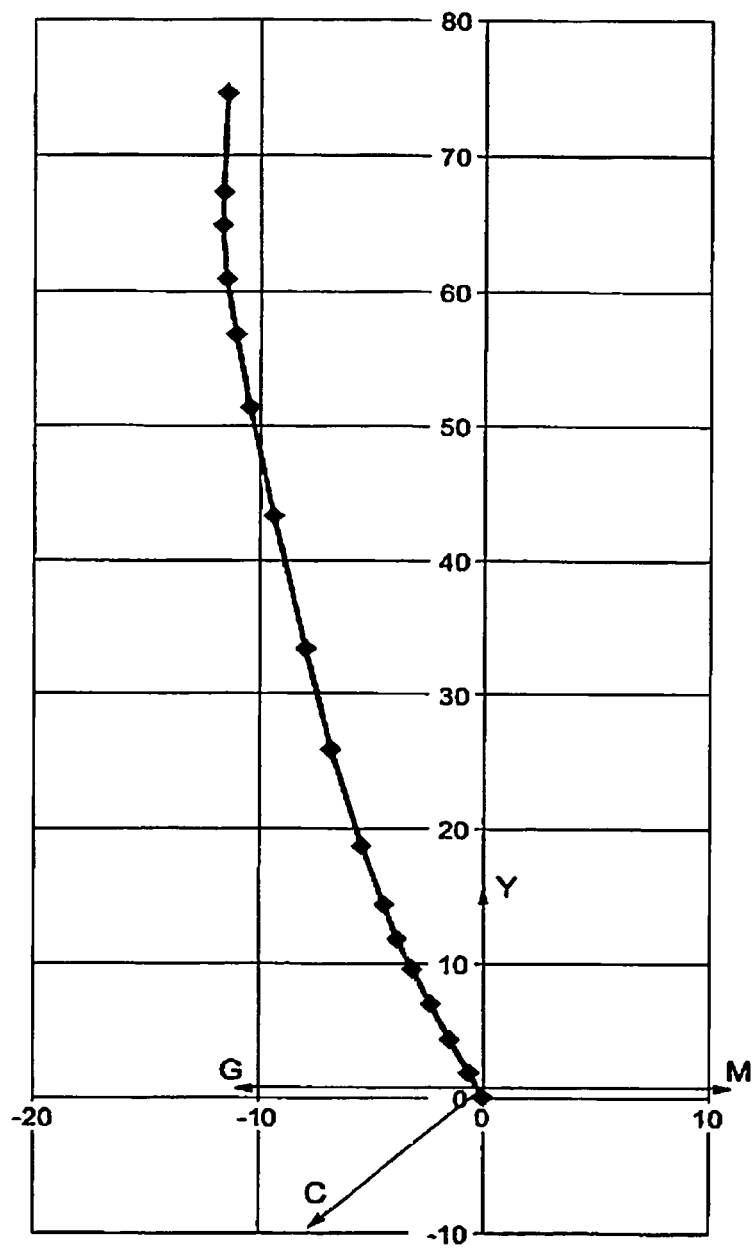
FIG. 8 is a graph showing a* values and b* values measured from a yellow test pattern.

Further, when the LAB value acquiring unit 85 measures the a* values and the b* values per density value of the density patterns in regard to the yellow test pattern formed by the recording head 14Y, as shown in FIG. 8, a curve representing the changes in the a* values and the b* values is obtained. Here, it will be understood from the curve of the a* values and the b* values that the color signal of G and the color signal of Y (=1−B) have sensitivity relating to the a* values and the b* values with respect to yellow. Consequently, in nonuniformity correction with respect to the yellow test pattern, the color signal of G and the color signal of Y (=1−B) are used.

Further, the LAB value acquiring unit 85 also calculates and acquires changes Δa* in the a* values and changes Δb* in the b* values between adjacent density patterns on the basis of the a* values and the b* values per density value of the density patterns.

The sensitivity percentage calculating unit 86 calculates sensitivity percentages of the C signal per density value of the density patterns and sensitivity percentages of the M signal per density value of the density patterns as described below in regard to the cyan test pattern.

First, the sensitivity percentage calculating unit 86 calculates, in accordance with expression (1) and expression (2) below, an angle x between the axis of the C signal and the curve of the a* and b* values in the a* and b* space and an angle γ between the axis of the M signal and the curve of the a* and b* values.

$$x = \pi/4 - \arctan(\Delta a^*/\Delta b^*) \quad (1)$$

$$y = \pi/2 + \arctan(\Delta a^*/\Delta b^*) \quad (2)$$

Here, Δa* is an amount of change in the a* values between adjacent density patterns, and Δb* is an amount of change in the b* values between adjacent density patterns.

The sensitivity percentage calculating unit 86 uses the angles x and y per density value of the density patterns calculated by expression (1) and expression (2) above and calculates, in accordance with expression (3) and expression (4) below, the sensitivity percentage of the C signal per density value of the density patterns and the sensitivity percentage of the M signal per density value of the density patterns.

$$\text{Sensitivity percentage of } C \text{ signal} = \sin y/(\sin y + \sin x) \quad (3)$$

$$\text{Sensitivity percentage of } M \text{ signal} = \sin x/(\sin y + \sin x) \quad (4)$$

The sensitivity percentage calculating unit 86 similarly calculates the sensitivity percentage of the C signal per density value of the density patterns and the sensitivity percentage of the M signal per density value of the density patterns in regard to the magenta test pattern. Further, the sensitivity percentage calculating unit 86 similarly calculates the sensitivity percentage of the G signal per density value of the density patterns and the sensitivity percentage of the Y signal per density value of the density patterns in regard to the yellow test pattern.

The ink color correction amount calculating unit 87 calculates, in regard to each jetting nozzle, correction amounts of the density values of cyan per density value of the density patterns in accordance with expression (5) below on the basis of the sensitivity percentages of the C signal per density value of the density patterns and the sensitivity patterns of the M signal per density pattern and on the basis of the correction amounts of the C signal and the correction amounts of the M signal per density value of the density patterns with respect to each jetting nozzle in regard to the cyan test pattern.

$$\Delta\text{Cyan}(C\text{in}) = \Delta C(C\text{in})^* \sin y/(\sin y + \sin x) + \Delta M (C\text{in})^* \sin x/(\sin y + \sin x) \quad (5)$$

Here, Cin represents input density values of cyan of the density patterns.

The ink color correction amount calculating unit 87 similarly calculates correction amounts of the density values of magenta per density value of the density patterns in regard to each jetting nozzle in accordance with expression (6) below.

$$\Delta\text{Magenta}(C\text{in}) = \Delta C(C\text{in})^* \sin y/(\sin y + \sin x) + \Delta M (C\text{in})^* \sin x/(\sin y + \sin x) \quad (6)$$

Further, the ink color correction amount calculating unit 87 similarly calculates correction amounts of the density values of yellow per density value of the density patterns in regard to each jetting nozzle.

The correction LUT creating unit 88 calculates, in regard to each jetting nozzle, correction amounts of the density values of cyan in each tone of the density values by linearly interpolating the correction amounts of the density values of cyan per density value of the density patterns. The correction LUT creating unit 88 creates, in regard to each jetting nozzle, a correction-use lookup table (hereinafter called a "correction LUT") that corrects the input density values of cyan for moving closer to target densities the output densities of the jetting nozzles corresponding to positions where density nonuniformity has been detected on the basis of the correction amounts of the density values of cyan in each tone of the density values.

The correction LUT creating unit 88 similarly creates, in regard to each jetting nozzle, a correction LUT also in regard to magenta and yellow.

The correction LUT creating unit 88 outputs to, and stores in, the hard disk storage device 56 the correction LUTs it has created.

The input image acquiring unit 92 reads and acquires from the hard disk storage device 56 image data inputted by the image data input unit 58 and converts the image data into input density values of cyan, input density values of magenta, input density values of yellow and input density values of black. The image correcting unit 94 uses the correction LUTs stored in the hard disk storage device 56 to correct the input density values of cyan, the input density values of magenta and the input density values of yellow. The image correcting unit 94 outputs the data it has corrected to the image formation control unit 62.

The test image generating unit 96 generates, and outputs to the image formation control unit 62, image data representing the test pattern 72 on the basis of the test pattern data stored in the hard disk storage device 56.

Figure 9:
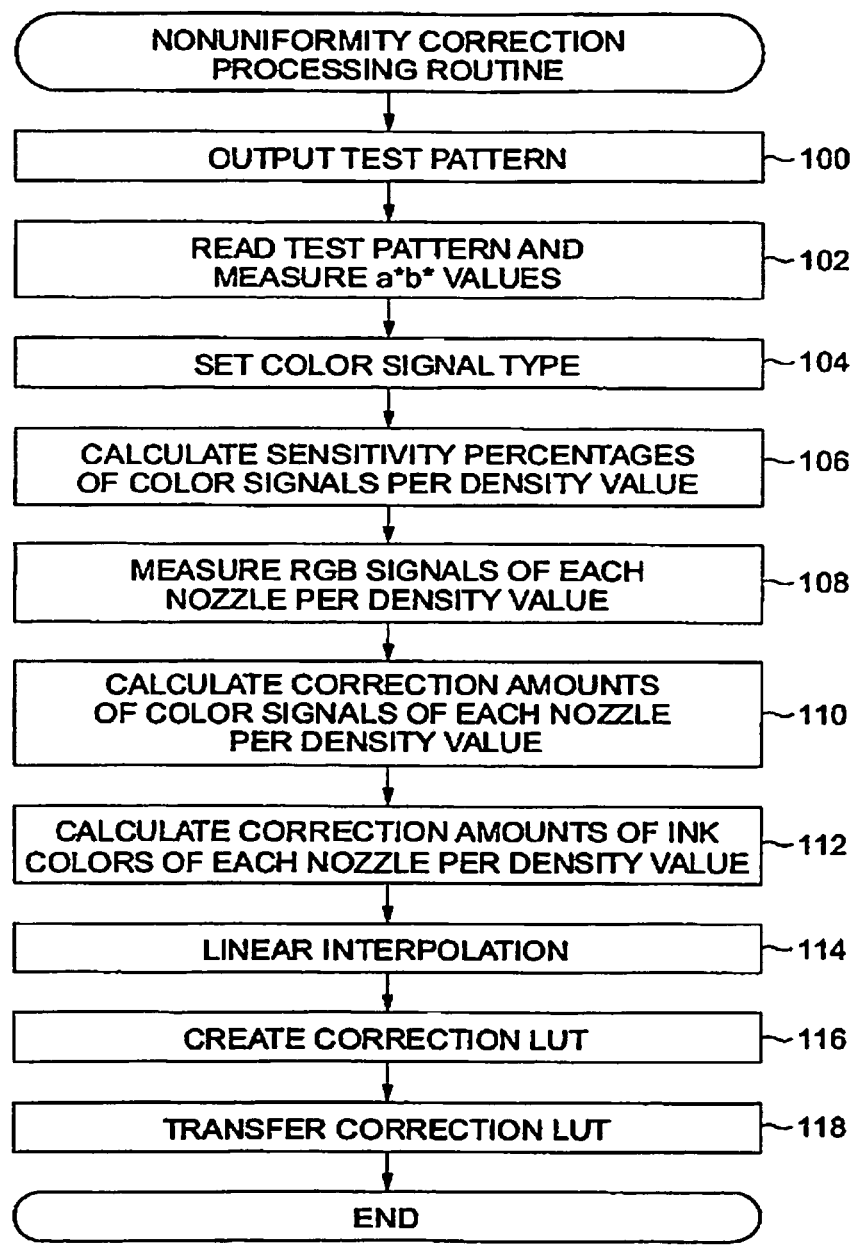
FIG. 9 is a flowchart showing a nonuniformity correction processing routine in the first exemplary embodiment of the invention.

Next, a nonuniformity correction processing routine in the first exemplary embodiment will be described with reference to FIG. 9. When an instruction signal instructing density nonuniformity correction is inputted, the CPU 50 executes a density nonuniformity correction program stored in the ROM 52, whereby the present routine starts in regard to each ink color of cyan, magenta and yellow. A case where the routine performs density nonuniformity correction in regard to cyan will be described below.

First, in step 100, the routine creates the cyan test pattern 72, and the cyan test pattern 72 is formed on the recording paper 16 by the recording head array 12 and the image formation control unit 62. Then, in step 102, when the recording paper 16 on which the test pattern 72 has been formed is conveyed to the reading position of the optical sensor 46, the optical sensor 46 reads an image from the entire surface of the test pattern 72 formed on the recording paper 16 and outputs reading data based on the test pattern 72. Further, when the recording paper 16 on which the test pattern 72 has been formed is conveyed to the measurement position of the LAB measuring unit 48, the LAB measuring unit 48 measures the a* values and the b* values from the entire surface of the test pattern 72 formed on the recording paper 16 and, as shown in FIG. 10, measures the a* values and the b* values of each density pattern of the test pattern 72. Further, the amounts-of-change Δa in the a* values and the amounts-of-change Δb in the b* values between the density patterns of the test pattern 72 are also calculated.

In the next step 104, the routine sets the color signal of C (=1−R) and the color signal of M (=1−G) that are predetermined as color signals having sensitivity with respect to cyan. Then, in step 106, the routine calculates sensitivity percentages of each of the color signal of C and the color signal of M per density value of the density patterns of the cyan test pattern 72 in accordance with expression (1) to expression (4) above on the basis of the a* values and the b* values of each density pattern of the test pattern 72 measured in step 102. As shown in FIG. 10, x, y, sin x and sin y per density value of the density patterns of the cyan test pattern 72 are calculated, and as shown in FIG. 11, sensitivity percentages of each of the color signal of C and the color signal of M are calculated per density value of the density patterns.

In the next step 108, the routine measures the pixel values of each of the color signals of RGB of each jetting nozzle per density value of the density patterns of the cyan test pattern 72 on the basis of the reading data based on the test pattern 72 obtained in step 102.

Then, in step 110, the routine calculates correction amounts of the density values of each of the color signals of RGB of each jetting nozzle and calculates correction amounts of the density values of each of the color signals of CMY of each jetting nozzle per density value of the cyan test pattern 72 on the basis of the pixels values of each of the color signals of RGB of each jetting nozzle measured per density value of the density patterns of the cyan test pattern 72 in step 108 (see ΔC and ΔM in FIG. 11).

In the next step 112, the routine calculates correction amounts of the input density values of cyan of each jetting nozzle per density value of the density patterns of the cyan test pattern 72 as shown in FIG. 11 and FIG. 12(1) in accordance with expression (5) above on the basis of the sensitivity percentages of each of the color signal of C and the color signal of M per density value of the density patterns of the cyan test pattern 72 calculated in step 106 and on the basis of the correction amounts of the density values of each of the color signal of C and the color signal of M per density value of the density patterns of the cyan test pattern 72 calculated in step 110.

Then, in step 114, the routine determines correction amounts of the input density values of cyan of each jetting nozzle with respect to each tone of the density values as shown in FIG. 12(2) by linearly interpolating the correction amounts of the input density values of cyan of each jetting nozzle per density value of the density patterns of the cyan test pattern 72 calculated in step 112.

In the next step 116, the routine creates the correction LUT shown in FIG. 12(3) such that the output densities in the positions of each jetting nozzle become closer to target densities on the basis of the correction amounts of the input density values of cyan of each jetting nozzle with respect to each tone of the density values determined in step 114. In step 118, the routine transfers to, and stores in, the hard disk storage device 56 the correction LUT it created, and then the nonuniformity correction processing routine ends.

Further, the nonuniformity correction processing routine is executed in the same manner also in regard to magenta and yellow.

When the liquid droplet jetting apparatus 10 receives input of image data from a personal computer or the like, the image data are temporarily stored in the hard disk storage device 56 and are read from the hard disk storage device 56. Then, the image data are converted to input density values of each jetting nozzle in each ink color of cyan, magenta, yellow and black and are converted to input density values after correction by the correction LUTs stored in the hard disk storage device 56, whereby the input density values are corrected. Then, the recording heads 14C, 14M, 14Y, 14K and 14T are driven on the basis of the corrected input density values, and an image based on the image data is formed on the recording paper 16.

In the exemplary embodiment described above, a case where the liquid droplet jetting apparatus measures CIELAB a* values and b* values in regard to the test patterns has been taken as an example and described, but the liquid droplet jetting apparatus is not limited to this and may also, for example, be configured to measure the values of an XYZ color system (or any other color standards or color spaces available). In this case, it suffices for the liquid droplet jetting apparatus to calculate the sensitivities of each of RGB relating to the values of the XYZ color system it has measured.

Further, a case where color signals having sensitivity to each of cyan, magenta and yellow are preset from among the color signals of RGBCMY has been taken as an example and described, but the liquid droplet jetting apparatus is not limited to this. The liquid droplet jetting apparatus may also be configured to set color signals having sensitivity in regard to each of cyan, magenta and yellow on the basis of the a* values and the b* values it measured in regard to the test patterns of each of cyan, magenta and yellow.

Further, a case where the liquid droplet jetting apparatus calculates sensitivity percentages of each signal of RGB relating to the a* values and the b* values it measured has been taken as an example and described, but the liquid droplet jetting apparatus is not limited to this. The liquid droplet jetting apparatus may also be configured to calculate the sensitivity percentages of each signal of RGB relating to the pixel values of RGB it measured in regard to the test patterns.

Next, a second exemplary embodiment will be described. The same reference numerals will be given to portions having the same configurations as those in the first exemplary embodiment, and description relating to the configurations of those portions will be omitted.

The second exemplary embodiment differs from the first exemplary embodiment in that the liquid droplet jetting apparatus computes density values of the ink colors from the test patterns to create correction LUTs.

The liquid droplet jetting apparatus according to the second exemplary embodiment is not equipped with the LAB measuring unit 48. Further, an image data processing unit 264 of the liquid droplet jetting apparatus performs processing of reading data obtained by the optical sensor 46 reading the test pattern and creates a correction LUT for correcting the ink densities of the image to be formed on the recording paper 16.

Figure 13:
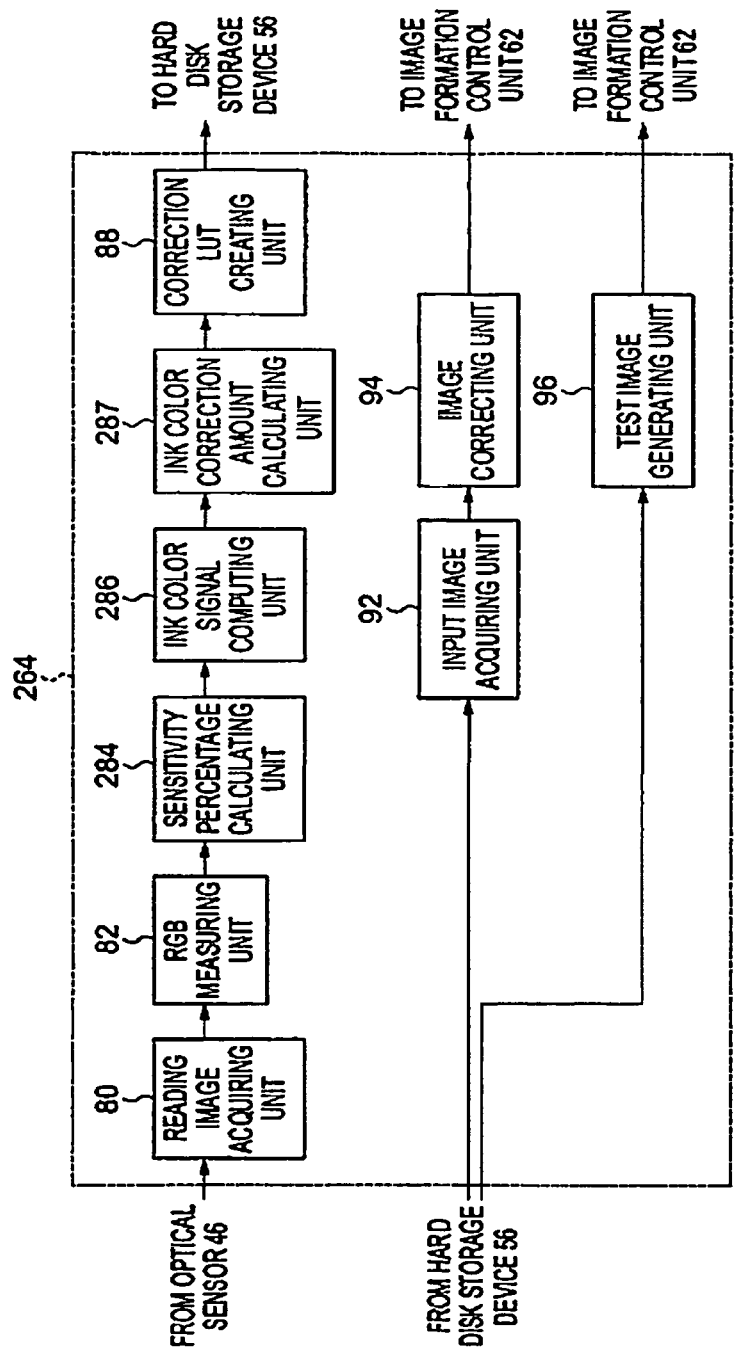
FIG. 13 is a block diagram showing the functional configuration of an image data processing unit of a liquid droplet jetting apparatus according to a second exemplary embodiment of the invention.

When expressed in functional blocks, the image data processing unit 264 is, as shown in FIG. 13, equipped with the reading image acquiring unit 80, the RGB measuring unit 82, a sensitivity percentage calculating unit 284, an ink color signal computing unit (a color material density value calculating unit) 286, an ink color correction amount calculating unit (a correction amount calculating unit) 287, the correction LUT creating unit 88, the input image acquiring unit 92, the image correcting unit 94 and the test image generating unit 96.

The sensitivity percentage calculating unit 284 calculates sensitivity percentages of each signal of RGB per density value of the density patterns as described below in regard to the cyan test pattern.

First, the sensitivity percentage calculating unit 284 calculates, in accordance with expression (7) to expression (9) below, sensitivities $K\_R(a)$, $K\_G(a)$ and $K\_B(a)$ of each signal of RGB with respect to the density patterns of density values a.

$$K\_R(a)=[R(b)-R(a)]/(b-a) \quad (7)$$

$$K\_G(a)=[G(b)-G(a)]/(b-a) \quad (8)$$

$$K\_B(a)=[B(b)-B(a)]/(b-a) \quad (9)$$

Next, the sensitivity percentage calculating unit 284 calculates, in accordance with expression (10) below, a sum sensitivity SumK(a) that is the total of the sensitivities of each signal of RGB.

$$SumK(a)=K\_R(a)+K\_G(a)+K\_B(a) \quad (10)$$

Here, K_R(a)>0, K_G(a)>0 and K_B(a)>0, and sensitivities less than 0 are not added to the sum sensitivity SumK(a).

Additionally, the sensitivity percentage calculating unit 284 calculates sensitivity percentages K_R(a)/SumK(a), K_G(a)/SumK(a) and K_B(a)/SumK(a) of each signal of RGB with respect to the density patterns of the density values a.

The sensitivity percentage calculating unit 284 similarly calculates sensitivity percentages of each signal of RGB per density value of the density patterns in regard the magenta test pattern. Further, the sensitivity percentage calculating unit 284 similarly calculates sensitivity percentages of each signal of RGB per density value of the density patterns in regard the yellow test pattern.

The ink color signal computing unit 286 normalizes the pixel values (scan values) of each of the RGB signals in the recording positions of each jetting nozzle per density value of the density patterns in regard to each test pattern of cyan, magenta and yellow and converts the values of the RGB signals such that the maximum value of the pixel values of each of the RGB signals becomes 255. The ink color signal computing unit 286 calculates, in regard to each jetting nozzle, actual density values NewS(a) with respect to the input density values a of the density patterns per density value of the density patterns in accordance with expression (11) below in regard to each test pattern of cyan, magenta and yellow.

$$NewS(a) = S\_R(a)*K\_R(a)/SumK(a) + \\ S\_G(a)*K\_G(a)/SumK(a) + S\_B(a)*K\_B(a)/SumK(a) \quad (11)$$

Here, S_R(a), S_G(a) and S_B(a) are normalized RGB signals. Further, expression (11) above is an expression when K_R(a)>0, K_G(a)>0 and K_B(a)>0, and when there is a signal whose sensitivity is less than 0, items relating to the signal whose sensitivity is less than 0 are not added to NewS(a).

The ink color correction amount calculating unit 287 calculates, in regard to each jetting nozzle, correction amounts of the input density values of cyan per density value of the density patterns on the basis of the input density values a of the density patterns and the actual density values NewS(a) with respect to the input density values a of the density patterns.

The ink color correction amount calculating unit 287 similarly calculates, in regard to each jetting nozzle, correction amounts of the input density values of magenta per density value of the density patterns and calculates, in regard to each jetting nozzle, correction amounts of the input density values of yellow per density value of the density patterns.

Figure 14:
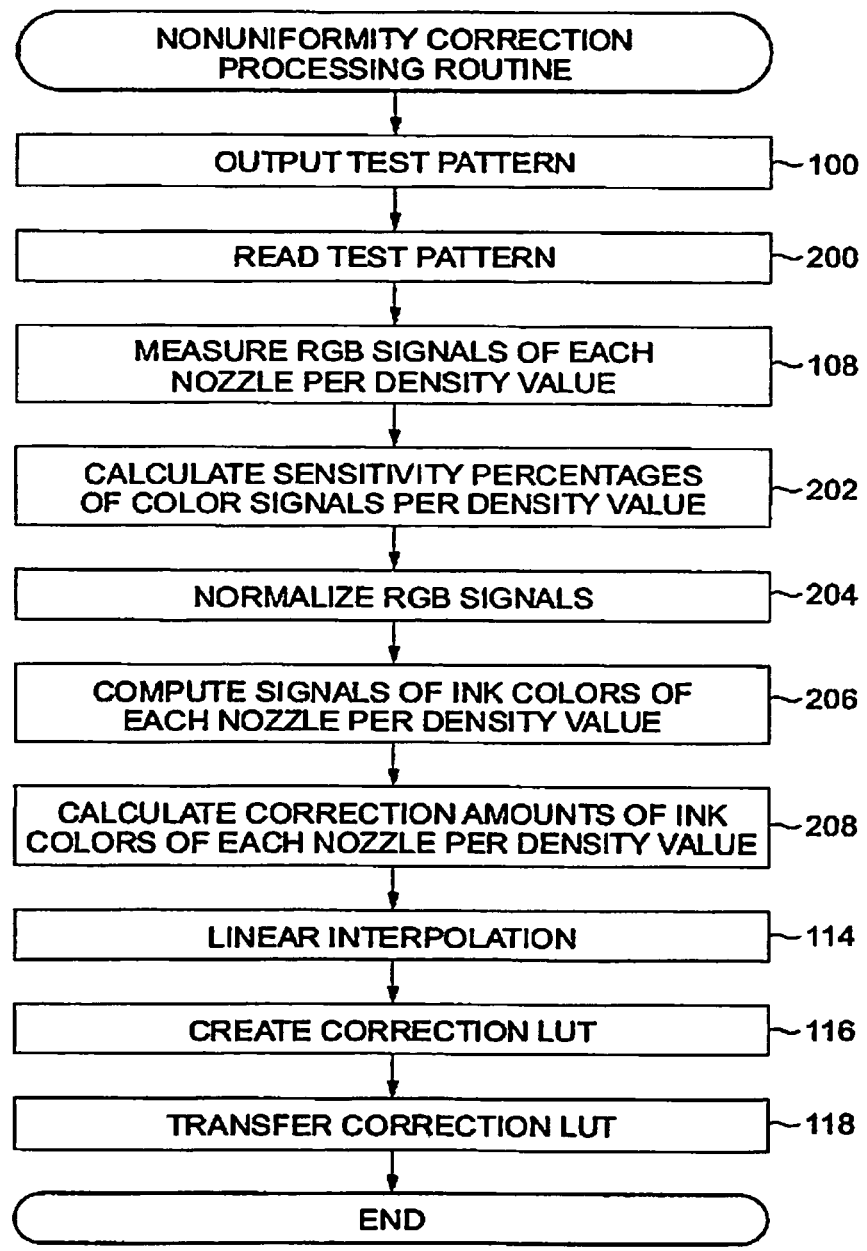
FIG. 14 is a flowchart showing a nonuniformity correction processing routine in the second exemplary embodiment of the invention.

Next, a nonuniformity correction processing routine in the second exemplary embodiment will be described with reference to FIG. 14. A case where the routine performs density nonuniformity correction in regard to cyan will be described below. Further, the same reference numerals will be given to processing that is the same as in the first exemplary embodiment, and description of that same processing will be omitted.

First, in step 100, the routine creates the cyan test pattern 72, and the cyan test pattern 72 is formed on the recording paper 16 by the recording head array 12 and the image formation control unit 62. Then, in step 200, when the recording paper 16 on which the test pattern 72 has been formed is conveyed to the reading position of the optical sensor 46, the optical sensor 46 reads an image from the entire surface of the test pattern 72 formed on the recording paper 16 and outputs reading data based on the test pattern 72.

In the next step 108, the routine measures the pixel values of each of the color signals of RGB of each jetting nozzle per density value of the density patterns of the cyan test pattern 72 as shown in FIG. 15(1) on the basis of the reading data based on the test pattern 72 obtained in step 200.

Then, in step 202, as shown in FIG. 15(2), the routine calculates sensitivities of each signal of RGB per density value of the density patterns of the cyan test pattern 72 and calculates sum sensitivities. Further, the routine calculates sensitivity percentages of each signal of RGB per density value of the test pattern 72.

In the next step 204, as shown in FIG. 16(1), the routine normalizes the pixel values of each of the color signals of RGB of each jetting nozzle measured per density value of the cyan test pattern 72 obtained in step 108. Then, in step 206, the routine calculates actual density values of cyan of each jetting nozzle per density value of the density patterns of the cyan test pattern 72 as shown in FIG. 16(2) in accordance with expression (11) on the basis of the sensitivity percentages of each signal of RGB per density value calculated in step 202 and on the basis of the pixel values of each signal of RGB of each jetting nozzle per density value normalized in step 204.

Figure 17:
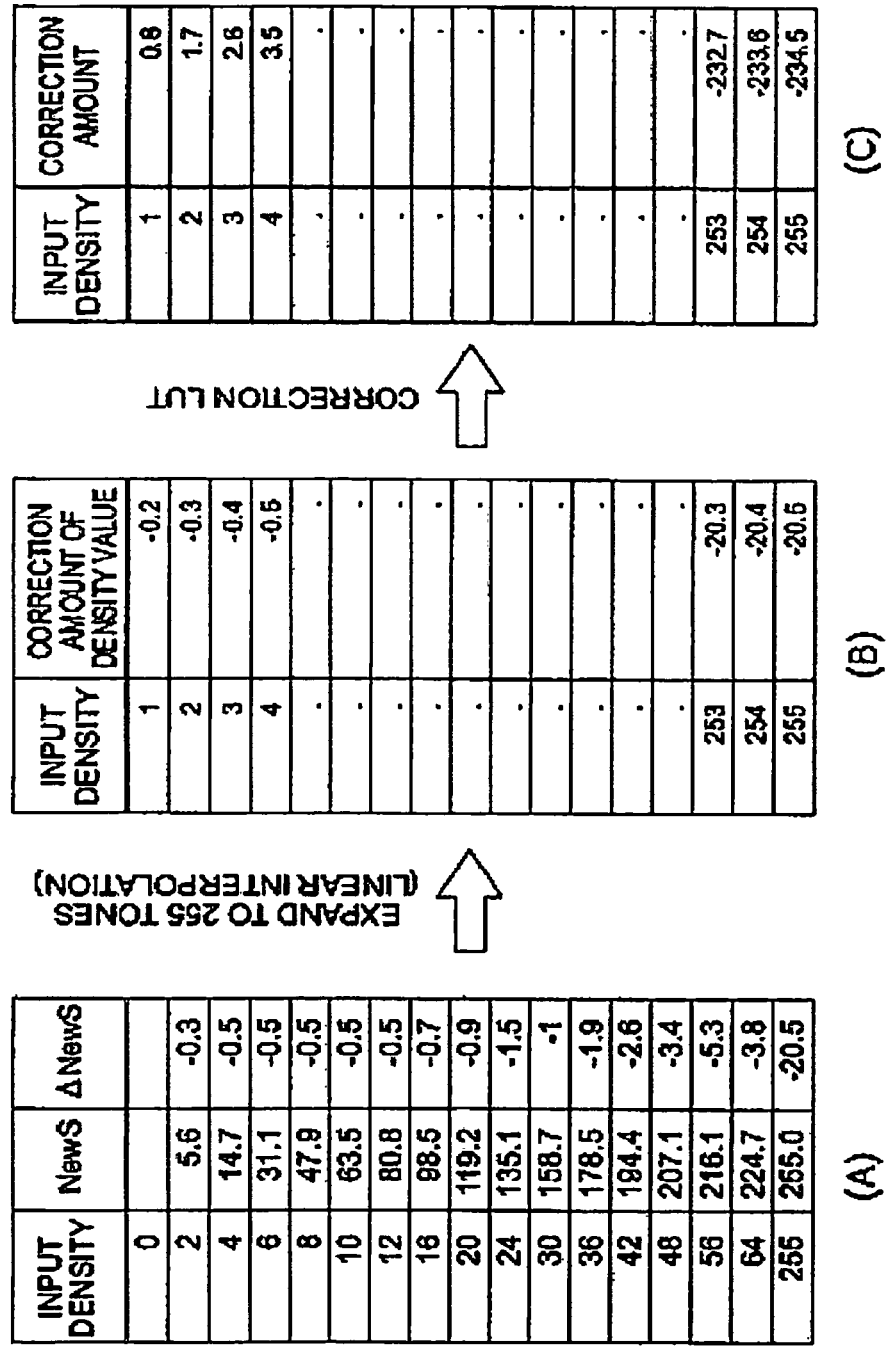
FIG. 17 is a diagram showing one example of correction amounts of density values obtained in regard to each input density value of the cyan test pattern (FIG. 17(1)), showing one example of correction amounts of density values obtained in regard to each tone of the input density values of the cyan test pattern (FIG. 17(2)), and showing one example of correction values of density values obtained in regard to each tone of the input density values of the cyan test pattern (FIG. 17(3))

In the next step 208, the routine calculates correction amounts of the input density values of cyan of each jetting nozzle per density value of the density pattern of the cyan test pattern 72 as shown in FIG. 17(1) on the basis of the density values of the density patterns of the test pattern 72 and on the basis of the actual density values of cyan of each jetting nozzle calculated in step 206.

Then, in step 114, the routine determines correction amounts of the input density values of cyan of each jetting nozzle with respect to each tone of the density values as shown in FIG. 17(2) by linearly interpolating the correction amounts of the input density values of cyan of each jetting nozzle per density value of the density patterns of the cyan test pattern 72 calculated in step 208.

In the next step 116, the routine creates a correction LUT as shown in FIG. 17(3) on the basis of the correction amounts of the input density values of cyan of each jetting nozzle with respect to each tone of the density values determined in step 114. In step 118, the routine transfers to, and stores in, the hard disk storage device 56 the correction LUT it created, and then the nonuniformity correction processing routine ends.

Further, the nonuniformity correction processing routine is executed in the same manner also in regard to magenta and yellow.

In regard to the yellow test pattern 72, as shown in FIG. 18(1), the pixel values of each of the color signals of RGB per jetting nozzle are measured per density value of the yellow test pattern 72.

Additionally, as shown in FIG. 18(2), the sensitivities of each signal of RGB per density value of the density patterns of the yellow test pattern 72 are calculated. At this time, the sensitivities of the R signal are less than 0 because of the density values of the density patterns, so the G signal and the B signal excluding the R signal are set as signals having sensitivity with respect to yellow. Consequently, the G signal and the B signal are used in the calculation of the sensitivity percentages, the normalization of the signals, the calculation of the actual density values of yellow and the calculation of the correction amounts of the density values.

Further, as shown in FIG. 19(1), the pixel values of each of the color signals of GB of each jetting nozzle measured per density value of the yellow test pattern 72 are normalized. Additionally, as shown in FIG. 19(2), the actual density values of yellow of each jetting nozzle are calculated per density value of the yellow test pattern 72.

In the exemplary embodiment described above, a case where the liquid droplet jetting apparatus sets color signals having sensitivity (whose sensitivity is greater than 0) with respect to each of cyan, magenta and yellow from among the signals of RGB on the basis of the sensitivities of each signal of RGB relating to the pixel values of RGB it measured in regard to the test patterns has been taken as an example and described, but the liquid droplet jetting apparatus may also set beforehand color signals having sensitivity in regard to each of cyan, magenta and yellow from among the color signals of RGB.

Further, similar to the first exemplary embodiment described above, the liquid droplet jetting apparatus may also be configured to measure a* values and b* values in regard to the test patterns of each of cyan, magenta and yellow and set color signals having sensitivity in regard to each of cyan, magenta and yellow from among the color signals of RGB-CMY on the basis of the a* values and the b* values it measured. In this case, it suffices for the liquid droplet jetting apparatus to calculate the sensitivity percentages of each signal of RGBCMY relating to the a* values and the b* values it measured.

Further, a case where the liquid droplet jetting apparatus measures the pixel values of the signals of RGB from the reading data of the test pattern and uses the pixel values of the signals of RGB to perform calculation of the sensitivities of RGB and to perform calculation of the actual density values of each of cyan, magenta and yellow has been taken as an example and described, but the liquid droplet jetting apparatus is not limited to this. The liquid droplet jetting apparatus may also be configured to replace each signal of RGB with each signal of CMY (C=1−R, M=1−G and Y=1−B) and perform calculation of the sensitivities of CMY and perform calculation of the actual density values of each of cyan, magenta and yellow.

Next, a third exemplary embodiment will be described. The same reference numerals will be given to portions having the same configurations as those in the first exemplary embodiment, and description of those portions will be omitted.

The third exemplary embodiment differs from the first exemplary embodiment in that the liquid droplet jetting apparatus uses each signal of RGB that has been measured to calculate sensitivity percentages of RGB.

The liquid droplet jetting apparatus according to the third exemplary embodiment is not equipped with the LAB measuring unit 48. Further, an image data processing unit 364 of the liquid droplet jetting apparatus performs processing of reading data obtained by the optical sensor 46 reading the test pattern and creates a correction LUT for correcting the ink densities (input density values) of the image to be formed on the recording paper 16.

Figure 20:
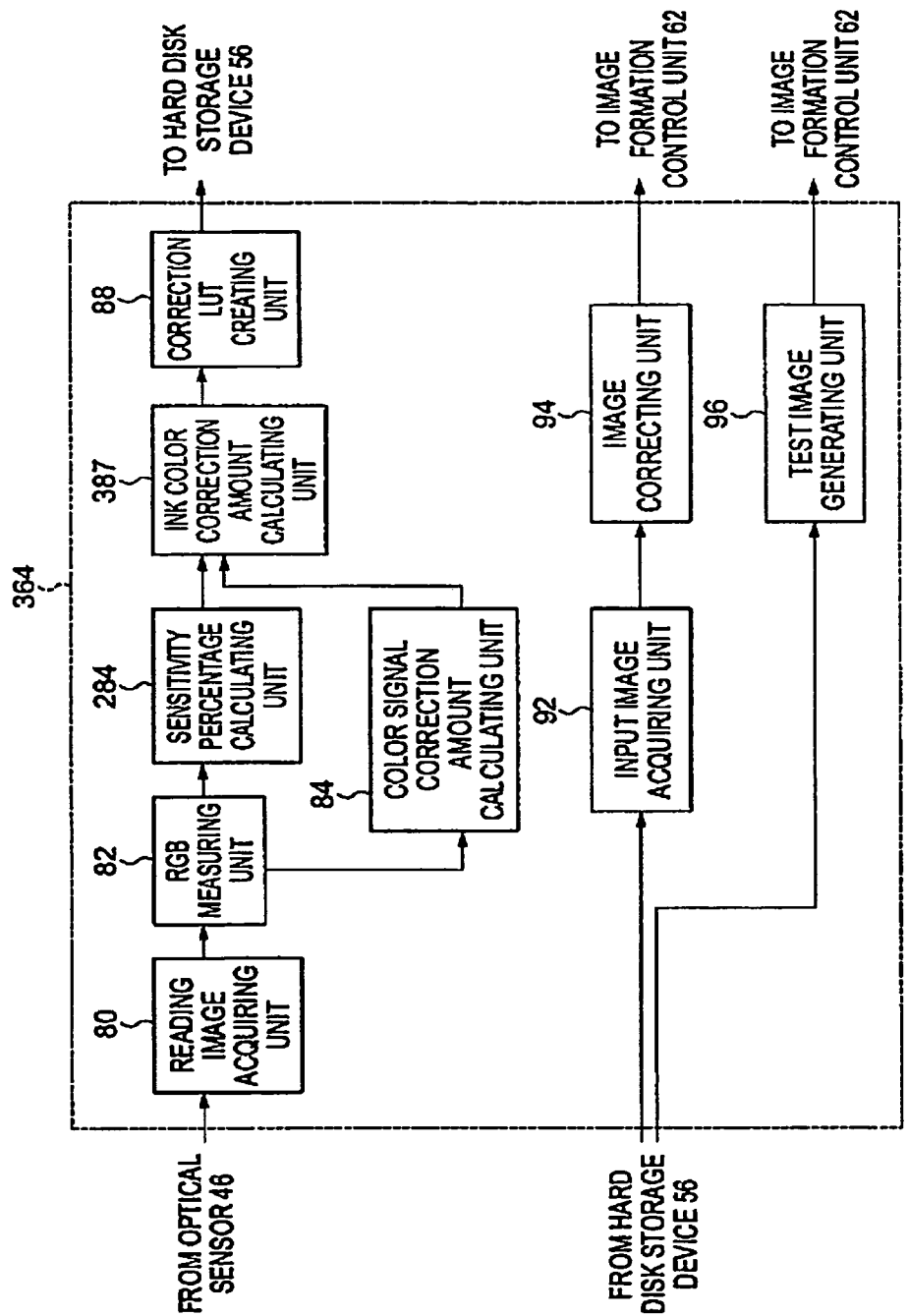
FIG. 20 is a block diagram showing the functional configuration of an image data processing unit of a liquid droplet jetting apparatus according to a third exemplary embodiment of the invention.

When expressed in functional blocks, the image data processing unit 364 is, as shown in FIG. 20, equipped with the reading image acquiring unit 80, the RGB measuring unit 82, the color signal correction amount calculating unit 84, the sensitivity percentage calculating unit 284, an ink color correction amount calculating unit (a second correction amount calculating unit) 387, the correction LUT creating unit 88, the input image acquiring unit 92, the image correcting unit 94 and the test image generating unit 96.

The color signal correction amount calculating unit 84 calculates corrections amounts ΔR, ΔG and ΔB for nonuniformity correction of each of the RGB signals on the basis of each of the pixel values (scan values) of the RGB signals in the recording positions of each jetting nozzle per density value of the density patterns.

The sensitivity percentage calculating unit 284 calculates the sensitivities K_R(a), K_G(a) and K_B(a) of each signal of RGB with respect to the density patterns of density values a in regard to each test pattern of cyan, magenta and yellow and calculates the sum sensitivity SumK(a) that is the total of the sensitivities of each signal of RGB. The sensitivity percentage calculating unit 284 calculates the sensitivity percentages K_R(a)/SumK(a), K_G(a)/SumK(a) and K_B(a)/SumK(a) of each signal of RGB with respect to the density patterns of density values a.

The ink color correction amount calculating unit 387 calculates, in regard to each jetting nozzle, correction amounts of the input density values of cyan per density value of the density patterns in accordance with expression (12) below on the basis of the sensitivity percentages of each signal of RGB per density value of the density patterns and on the basis of the correction amounts ΔR, ΔG and ΔB of each signal of RGB per density value of the density patterns with respect to each jetting nozzle in regard to the cyan test pattern.

$$\Delta Cyan(a) = \Delta R(a) * K\_R(a) / SumK(a) + \\ \Delta G(a) * K\_G(a) / SumK(a) + \Delta B(a) * K\_B(a) / SumK(a)$$ (12)

Here, expression (12) above is an expression when K_R(a)>0, K_G(a)>0 and K_B(a)>0, and when there is a signal whose sensitivity is less than 0, items relating to the signal whose sensitivity is less than 0 are not added to ΔCyan(a).

Further, the ink color correction amount calculating unit 387 similarly calculates, in regard to each jetting nozzle, correction amounts of the input density values of magenta per density value of the density patterns in regard to the magenta test pattern and similarly calculates, in regard to each jetting nozzle, correction amounts of the input density values of yellow per density value of the density patterns in regard to the yellow test pattern.

Figure 21:
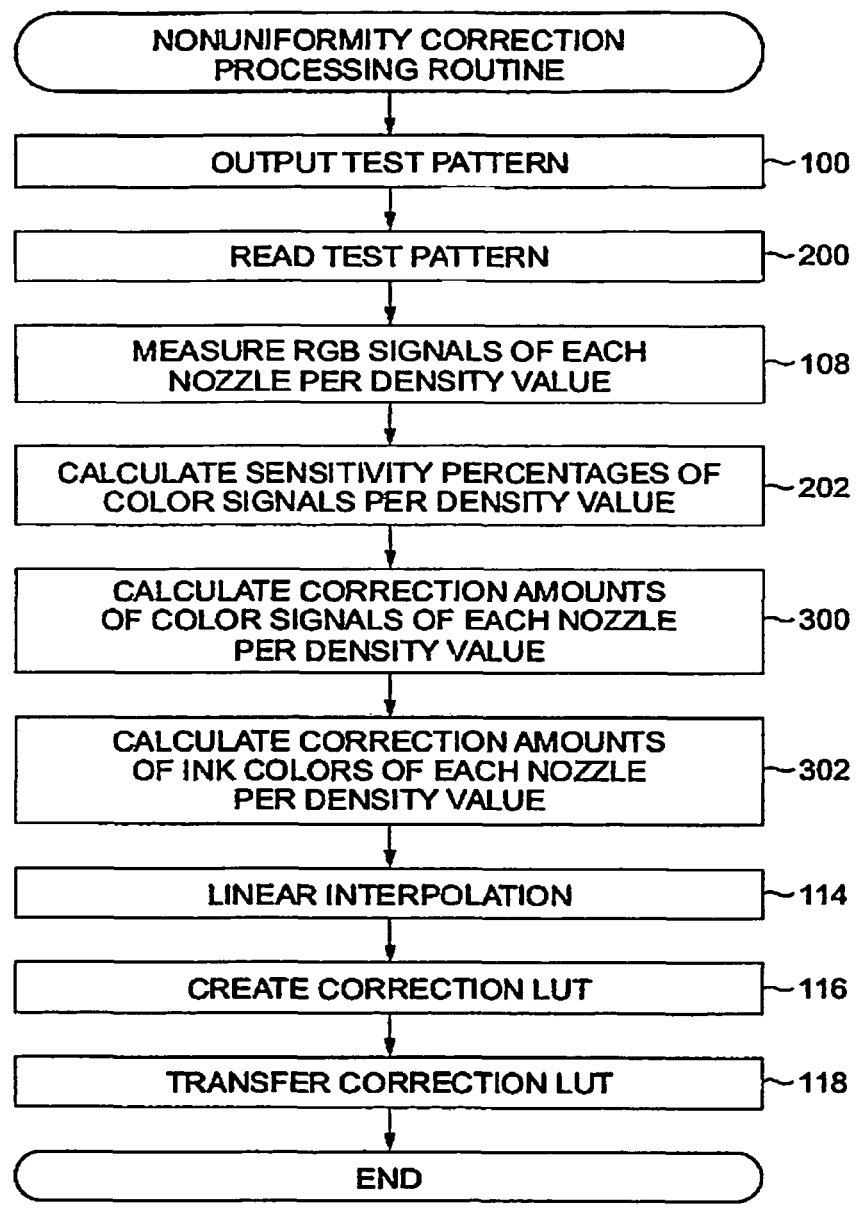
FIG. 21 is a flowchart showing a nonuniformity correction processing routine in the third exemplary embodiment of the invention.

Next, a nonuniformity correction processing routine in the third exemplary embodiment will be described with reference to FIG. 21. A case where the routine performs density nonuniformity correction in regard to cyan will be described below. Further, the same reference numerals will be given to processing that is the same as in the first exemplary embodiment, and description of that same processing will be omitted.

First, in step 100, the routine creates the cyan test pattern 72, and the cyan test pattern 72 is formed on the recording paper 16. Then, in step 200, the optical sensor 46 reads an image from the entire surface of the test pattern 72 formed on the recording paper 16 and outputs reading data based on the test pattern 72.

In the next step 108, the routine measures the pixel values of each of the color signals of RGB of each jetting nozzle per density value of the density patterns of the cyan test pattern 72 as shown in FIG. 15(1) on the basis of the reading data based on the test pattern 72 obtained in step 200.

Then, in step 202, as shown in FIG. 15(2), the routine calculates sensitivities of each signal of RGB per density value of the density patterns of the cyan test pattern 72 and calculates sum sensitivities. Further, as shown in FIG. 22(2), the routine calculates sensitivity percentages of each signal of RGB per density value of the test pattern 72 (see K_B %, K_G % and K_R % in FIG. 22(2)).

In the next step 300, the routine calculates correction amounts of the density values of each of the color signals of RGB of each jetting nozzle per density value of the density patterns of the cyan test pattern 72 on the basis of the pixel values of each of the color signals of RGB of each jetting nozzle measured per density value of the density patterns of the cyan test pattern 72 in step 108 (see ΔR, ΔG and ΔB in FIG. 22(1)).

Figure 23:
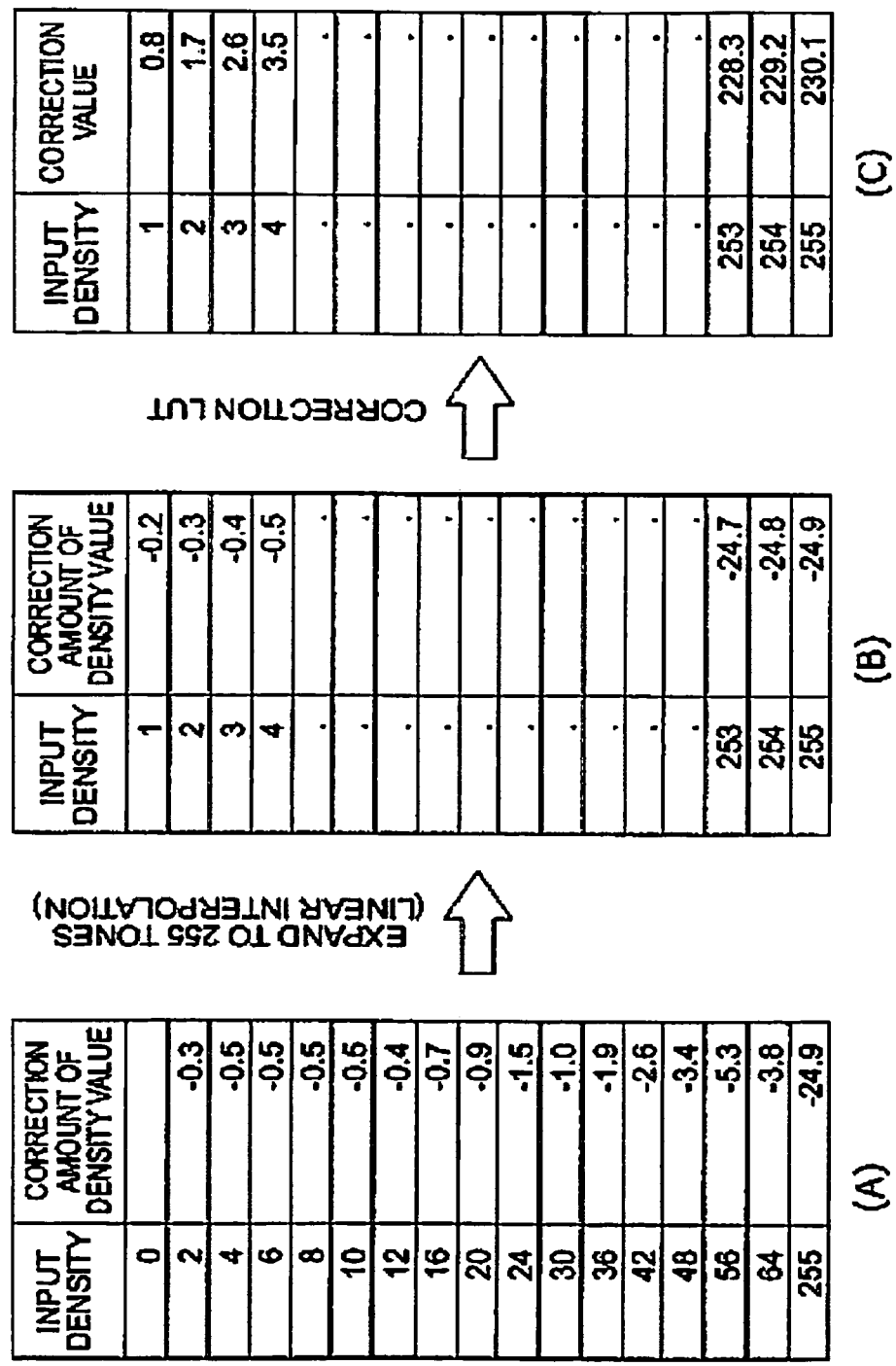
FIG. 23 is a diagram showing one example of correction amounts of density values obtained in regard to each input density value of the cyan test pattern (FIG. 23(1)), showing one example of correction amounts of density values obtained in regard to each tone of the input density values of the cyan test pattern (FIG. 23(2)), and showing one example of correction values of density values obtained in regard to each tone of the input density values of the cyan test pattern.

In the next step 302, the routine calculates correction amounts of the input density values of cyan of each jetting nozzle per density value of the cyan test pattern 72 as shown in FIG. 22(3) and FIG. 23(1) in accordance with expression (12) above on the basis of the sensitivity percentages of each signal of RGB per density value of the density patterns of the cyan test pattern 72 calculated in step 202 and on the basis of the correction amounts of the density values of each signal of RGB per density value of the cyan test pattern 72 calculated in step 300.

Then, in step 114, the routine determines correction amounts of the input density values of cyan of each jetting nozzle with respect to each tone of the density values as shown in FIG. 23(2) by linearly interpolating the correction amounts of the input density values of cyan of each jetting nozzle per density value of the cyan test pattern 72 calculated in step 302.

In the next step 116, the routine creates a correction LUT as shown in FIG. 23(3) on the basis of the correction amounts of the input density values of cyan of each jetting nozzle with respect to each tone of the density values determined in step 114. In step 118, the routine transfers to, and stores in, the hard disk storage device 56 the correction LUT it created, and then the nonuniformity correction processing routine ends.

Further, the nonuniformity correction processing routine is executed in the same manner also in regard to magenta and yellow.

In regard to the yellow test pattern 72, as shown in FIG. 18(1), the pixel values of each of the color signals of RGB per jetting nozzle are measured per density value of the yellow test pattern 72. Additionally, as shown in FIG. 18(2), the sensitivities of each signal of RGB per density value of the density patterns of the yellow test pattern 72 are calculated. At this time, the sensitivities of the R signal are less than 0 because of the density values, so the G signal and the B signal excluding the R signal are set as signals having sensitivity with respect to yellow. Consequently, the G signal and the B signal are used in the calculation of the sensitivity percentages and in the calculation of the correction amounts of the density values of yellow.

In the exemplary embodiment described above, a case where the liquid droplet jetting apparatus sets color signals having sensitivity (whose sensitivity is greater than 0) with respect to each of cyan, magenta and yellow from among the signals of RGB on the basis of the sensitivities of each signal of RGB relating to the pixel values of RGB it measured in regard to the test patterns has been taken as an example and described, but the liquid droplet jetting apparatus may also set beforehand color signals having sensitivity in regard to each of cyan, magenta and yellow from among the color signals of RGB.

Further, similar to the first exemplary embodiment described above, the liquid droplet jetting apparatus may also be configured to measure a* values and b* values in regard to the test patterns of each of cyan, magenta and yellow and set color signals having sensitivity in regard to each of cyan, magenta and yellow from among the color signals of RGB-CMY on the basis of the a* values and the b* values it measured. In this case, it suffices for the liquid droplet jetting apparatus to calculate the sensitivity percentages of each signal of RGBCMY relating to the a* values and the b* values it measured.

Further, a case where the liquid droplet jetting apparatus measures the pixel values of the signals of RGB from the reading data of the test pattern and uses the pixel values of the signals of RGB to perform calculation of the sensitivities of RGB and to perform calculation of the correction amounts of the input density values of each of cyan, magenta and yellow has been taken as an example and described, but the liquid droplet jetting apparatus is not limited to this. The liquid droplet jetting apparatus may also be configured to replace each signal of RGB with each signal of CMY (C=1−R, M=1−G and Y=1−B) and perform calculation of the sensitivities of CMY and perform calculation of the correction amounts of the input density values of each of cyan, magenta and yellow.

Further, in the first exemplary embodiment to the third exemplary embodiment, a case where the liquid droplet jetting apparatus forms an image (including characters) on recording paper has been taken as an example and described, but the recording medium is not limited to recording paper, and the liquid that the liquid droplet jetting apparatus jets is not limited to ink liquid. For example, the invention may also be applied to other liquid droplet jetting and recording apparatus such as pattern forming apparatus that jet liquid droplets onto a sheet-like substrate for pattern formation of a semiconductor or a liquid crystal display.

Further, a case where the image forming apparatus of the present invention is applied to a liquid droplet jetting apparatus has been taken as an example and described, but the image forming apparatus of the present invention may also be applied to an LED printer or a thermal printer. An LED printer to which the present invention is applied has: an exposure unit that has plural light emitting elements arrayed in a predetermined direction as recording elements and forms an electrostatic latent image on a photoconductor by causing the light emitting elements to emit light in accordance with input pixel values; and a developing unit that develops the electrostatic latent image formed by the exposure unit to form an image. Additionally, the LED printer changes the light emission amounts per light emitting element and corrects the density of the image to be formed by the developing unit by converting input density values to conversion density values on the basis of a correction LUT. Further, a thermal printer to which the present invention is applied has plural thermal heads arrayed in a predetermined direction as recording elements, applies a voltage to the recording elements in accordance with input density values, and presses the recording elements against heat-sensitive paper to form an image. Additionally, the thermal printer changes the voltage applied to the recording elements and corrects the density of the image to be formed by converting input density values to conversion density values on the basis of a correction LUT.

In the specification of the present application, exemplary embodiments have been described where the program is pre-installed, but it is also possible to store the program in a storage medium such as a CD-ROM and provide that program.

What is claimed is:

1. An image processing apparatus comprising:
   a sensitivity calculating unit that calculates, using reading data obtained by reading a reference image, sensitivities of each of plural types of color signals for each of different density values of a color material which is expressed by the plural types of color signals, the reference image being recorded by plural recording elements that use the color material to record and having plural density patterns for each of the different density values of the color material;
   a first correction amount calculating unit that calculates, for each of the different density values of the color material, first correction amounts for at least one of the plural recording elements in regard to each of the plural types of color signals on the basis of the reading data; and
   a second correction amount calculating unit that calculates, for each of the different density values of the color material with respect to the at least one of the plural recording elements, second correction amounts of the density values of the color material on the basis of the first correction amounts of the plural types of color signals and the sensitivities of the plural types of color signals.

2. The image processing apparatus according to claim 1, wherein
   the sensitivity calculating unit calculates sensitivities of each of at least one type of color signal predetermined as having sensitivity with respect to the color of the color material for each of the different density values of the color material,
   the first correction amount calculating unit calculates, for each of the different density values of the color material, correction amounts with respect to the at least one of the plural recording elements in regard to each of the at least one type of color signal on the basis of the reading data, and
   the second correction amount calculating unit calculates, for each of the different density values of the color material, correction amounts of the density values of the color material on the basis of the correction amounts of the color signals for each of the different density values with respect to the at least one of the plural recording elements that have been calculated in regard to each of the at least one type of color signal and on the basis of the sensitivities of each of the at least one type of color signal that have been calculated for each of the different density values of the color material in regard to the at least one of the plural recording elements.

3. The image processing apparatus according to claim 2, wherein the second correction amount calculating unit calculates multiplication values of correction amounts of the color signal of the density values and percentages of sensitivities of the color signals that are determined from the sensitivities of each color signal that have been calculated in regard to the density values in regard to each of the at least one type of color signal with respect to the density values of the color material and calculates, as the correction amounts of the density values of the color material, sums of the multiplication values that have been calculated in regard to each of the at least one type of color signal.

4. The image processing apparatus according to claim 1, wherein
   the first correction amount calculating unit calculates, for each of the different density values of the color material, correction amounts with respect to the at least one of the plural recording elements in regard to each of at least one type of color signal determined as having sensitivity with respect to the color of the color material on the basis of the calculated sensitivities on the basis of the reading data, and
   the second correction amount calculating unit calculates, for each of the different density values of the color material, correction amounts of the density values of the color material on the basis of the correction amounts of the color signals for each of the density values with respect to the at least one of the plural recording elements that have been calculated in regard to each of the at least one type of color signal and on the basis of the sensitivities of each of the at least one type of color signal that have been calculated for each of the different density values of the color material in regard to the at least one of the plural recording elements.

5. The image processing apparatus according to claim 4, wherein the second correction amount calculating unit calculates multiplication values of correction amounts of the color signals of the density values and percentages of sensitivities of the color signals that are determined from the sensitivities of each color signal that have been calculated in regard to the density values in regard to each of the at least one type of color signal with respect to the density values of the color material and calculates, as the correction amounts of the density values of the color material, sums of the multiplication values that have been calculated in regard to each of the at least one type of color signal.

6. An image processing apparatus for correcting density nonuniformity comprising:
   a sensitivity calculating unit that calculates, using reading data obtained by reading a reference image, sensitivities of each of plural types of the color signals for each of different density values of a color material which is expressed by the plural types of color signals, the reference image being recorded by plural recording elements that use color material to record and having plural density patterns for each of the different density values of the color material;
   a color material density value calculating unit that calculates density values of the color material with respect to at least one of the plural recording elements for each of the different density values of the color material on the basis of the reading data of each of the plural types of color signals for each of the different density values of the color material with respect to the at least one of the plural recording elements, and on the basis of the sensitivities calculated by the sensitivity calculating unit; and
   a correction amount calculating unit that calculates, for each of the different density values, correction amounts of the density values of the color material for the at least one of the plural recording elements using the density values of the color material calculated by the color material density value calculating unit.

7. The image processing apparatus according to claim 6, wherein
   the sensitivity calculating unit calculates sensitivities of each of at least one type of color signal predetermined as having sensitivity with respect to the color of the color material for each of the different density values of the color material, and the color material density value calculating unit calculates, on the basis of the reading data, density values of the color material with respect to the at least one of the plural recording elements for each of the different density values of the color material on the basis of each of the at least one type of color signal for each of the different density values of the color material with respect to the at least one of the plural recording elements and on the basis of the sensitivities of each of the at least one type of color signal that have been calculated for each of the different density values of the color material.

8. The image processing apparatus according to claim 7, wherein the color material density value calculating unit calculates multiplication values of correction amounts of the color signals of the density values and percentages of sensitivities of the color signals that are determined from the sensitivities of each color signal that have been calculated in regard to the density values in regard to each of the at least one type of color signal with respect to the density values of the color material and calculates, as the correction amounts of the density values, sums of the multiplication values that have been calculated in regard to each of the at least one type of color signal.

9. The image processing apparatus according to claim 8, wherein the correction amount calculating unit calculates, for each of the different density values, correction amounts of the density values of the color material for correction density nonuniformity with respect to the at least one of the plural recording elements on the basis of the density values of the color material with respect to the at least one of the plural recording elements that have been calculated for each of the different density values of the color material and on the basis of the different density values of the plural density patterns.

10. The image processing apparatus according to claim 6, wherein the color material density value calculating unit calculates, on the basis of the reading data, density values of the color material with respect to the at least one of the plural recording elements for each of the different density values of the color material on the basis of each of at least one type of color signal determined as having sensitivity with respect to the color of the color material on the basis of the calculated sensitivities for each of the different density values of the color material with respect to the at least one of the plural recording elements and on the basis of the sensitivities of each of the at least one type of color signal that have been calculated for each of the different density values of the color material.

11. The image processing apparatus according to claim 10, wherein the color material density value calculating unit calculates multiplication values of correction amounts of the color signals of the density values and percentages of sensitivities of the color signals that are determined from the sensitivities of each color signal that have been calculated in regard to the density values in regard to each of the at least one type of color signal with respect to the density values of the color material and calculates, as the correction amounts of the density values of the color material, sums of the multiplication values that have been calculated in regard to each of the at least one type of color signal.

12. The image processing apparatus according to claim 11, wherein the correction amount calculating unit calculates, for each of the different density values, correction amounts of the density values of the color material for correction density nonuniformity with respect to the at least one of the plural recording elements on the basis of the density values of the color material with respect to the at least one of the plural recording elements that have been calculated for each of the different density values of the color material and on the basis of the different density values of the plural density patterns.

13. An image forming apparatus comprising a image processing apparatus according to claim 6.

14. An image forming apparatus comprising a image processing apparatus according to claim 1.

15. A non-transitory computer-readable medium storing a program causing a computer to execute a process for density value correction, the process comprising:

calculating sensitivities of each of the color signals for each of the different density values of the color material, on the basis of a reading data obtained by reading a reference image, the reference image being recorded by plural recording elements that use color material to record, having plural density patterns for each of predetermined different density values of color material, and expressed by plural types of color signals;

calculating density values of the color material with respect to each recording element for each of the different density values of the color material on the basis of each of the color signals for each of the different density values of the color material with respect to each recording element of the reading data and on the basis of the sensitivities of each of the color signals that have been calculated for each of the different density values of the color material; and calculating, for each of the different density values, correction amounts of the density values of the color material with respect to each recording element on the basis of the density values of the color material, with respect to each recording element, that have been calculated for each of the different density values of the color material.

16. A non-transitory computer-readable medium storing a program causing a computer to execute a process for density value correction, the process comprising:

calculating sensitivities of each of the color signals for each of the different density values of the color material, on the basis of a reading data obtained by reading a reference image, the reference image being recorded by plural recording elements that use color material to record, having plural density patterns for each of predetermined different density values of color material, and expressed by plural types of color signals;

calculating, on the basis of the reading data, and for each of the different density values of the color material, correction amounts with respect to each recording element in regard to each of the color signals; and calculating, for each of the different density values of the color material, correction amounts of the density values of the color material on the basis of the correction amounts of the color signals for each of the different density values of the color material with respect to the recording elements that have been calculated in regard to each of the color signals and on the basis of the sensitivities of each of the color signals that have been calculated for each of the different density values of the color material in regard to each recording element.

* * * * *